US008919235B2

(12) United States Patent
Sudou et al.

(10) Patent No.: US 8,919,235 B2
(45) Date of Patent: Dec. 30, 2014

(54) CUTTING APPARATUS

(75) Inventors: Junichi Sudou, Hitachinaka (JP); Yoshimasa Hayama, Hitachinaka (JP); Toshihiro Enya, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 740 days.

(21) Appl. No.: 12/725,386

(22) Filed: Mar. 16, 2010

(65) Prior Publication Data

US 2010/0236369 A1 Sep. 23, 2010

(30) Foreign Application Priority Data

Mar. 17, 2009 (JP) ................................ 2009-064663
Mar. 17, 2009 (JP) ................................ 2009-064664

(51) Int. Cl.
*B26D 1/16* (2006.01)

(52) U.S. Cl.
USPC .............................. 83/471.2; 83/490; 83/574

(58) Field of Classification Search
USPC ......................... 83/564, 574, 471.2, 477, 490
See application file for complete search history.

(56) References Cited

U.S. PATENT DOCUMENTS 1,830,579 A * 11/1931 Wappat .......................... 30/391
2,759,507 A * 8/1956 Davis et al. .................. 144/285
3,570,564 A 3/1971 Bergler
3,727,502 A 4/1973 Steinman
4,109,901 A * 8/1978 Akin ............................ 269/290
4,252,239 A * 2/1981 Snyder ......................... 206/349
4,328,728 A * 5/1982 Ferdinand et al. ........... 83/471.3
4,378,716 A 4/1983 Volk
4,587,875 A * 5/1986 Deley .......................... 83/471.3
4,648,301 A * 3/1987 Scott ............................. 83/464
5,165,317 A * 11/1992 Findlay .......................... 83/574
5,911,482 A * 6/1999 Campbell et al. ............... 30/390
6,112,736 A * 9/2000 Bearden .................... 125/13.01
6,550,363 B2 4/2003 He
6,757,981 B2 * 7/2004 Hampton ....................... 30/372
6,854,495 B2 * 2/2005 Logan ....................... 144/286.5

(Continued)

FOREIGN PATENT DOCUMENTS

CN 1672844 A 9/2005
CN 101024289 A 8/2007
JP 2000-254817 A 9/2000

OTHER PUBLICATIONS

Office Action from China Intellectual Property Office for application CN201010143404.8 (Nov. 13, 2012).

(Continued)

*Primary Examiner* — Sean Michalski
(74) *Attorney, Agent, or Firm* — Kilpatrick Townsend & Stockton LLP

(57) ABSTRACT

A cutting apparatus includes a cutting device and a base section. The cutting device includes a motor, a housing, a circular saw blade, and a base plate. The circular saw blade is driven by the motor to cut a workpiece. The housing rotatably supports the circular saw blade and accommodates the motor. The base plate is connected with the housing and is formed with an opening into which the circular saw blade is inserted. The base plate includes a main base plate connected with the housing and a sub base plate detachably mounted on the main base plate. The base section supports the workpiece. The cutting device is detachably mounted on the base section and is pivotably supported by the base section to be moved toward and away from the base section to cut the workpiece.

16 Claims, 25 Drawing Sheets

(56) References Cited

U.S. PATENT DOCUMENTS

| | | | | |
|---|---|---|---|---|
| 7,059,225 | B1 * | 6/2006 | Rabell | 83/13 |
| 7,077,179 | B1 * | 7/2006 | Camiano et al. | 144/286.1 |
| 7,159,499 | B1 * | 1/2007 | Lanser | 83/796 |
| 7,281,332 | B2 * | 10/2007 | Niwa et al. | 30/376 |
| 7,293,489 | B1 * | 11/2007 | Wood | 83/167 |
| 7,555,976 | B2 * | 7/2009 | Logan et al. | 83/471 |
| 7,610,839 | B1 * | 11/2009 | Bessette | 83/743 |
| 7,661,194 | B1 * | 2/2010 | Ende | 30/376 |
| 8,061,250 | B2 | 11/2011 | Ushiwata et al. | |
| 8,104,183 | B2 | 1/2012 | Nakamura et al. | |
| 8,291,800 | B2 * | 10/2012 | Chang et al. | 83/471.2 |
| 2003/0024364 | A1 * | 2/2003 | Chang | 83/471.2 |
| 2006/0011032 | A1 * | 1/2006 | Brown et al. | 83/471.2 |
| 2006/0042102 | A1 * | 3/2006 | Lukens | 30/373 |
| 2007/0193040 | A1 | 8/2007 | Nakamura et al. | |
| 2009/0235796 | A1 * | 9/2009 | Kani et al. | 83/471.2 |
| 2009/0272242 | A1 * | 11/2009 | Okada et al. | 83/471.2 |
| 2011/0107892 | A1 * | 5/2011 | Imamura et al. | 83/471.3 |
| 2012/0132049 | A1 * | 5/2012 | Bokelaar | 83/574 |

OTHER PUBLICATIONS

German Patent Office office action for application DE102010011727.7 (Sep. 9, 2013).

* cited by examiner

CUTTING APPARATUS

CROSS REFERENCE TO RELATED APPLICATION

This application claims priority from Japanese Patent Application Nos. 2009-064663 filed Mar. 17, 2009 and 2009-064664 filed Mar. 17, 2009. The entire content of each of these priority applications is incorporated herein by reference.

TECHNICAL FIELD

The present invention relates to a cutting apparatus. More specifically, the present invention relates to a cutting apparatus having a cutting device that is detachably mounted on a base section.

BACKGROUND

Conventionally, it has been well known a cutting apparatus having a portable circular saw device as a cutting device that is detachably mounted on a fixed surface plate as a base section. Such a cutting apparatus has been disclosed in U.S. Pat. No. 4,587,875. In the cutting apparatus, a base plate is movably fixed to a base section. The base plate is formed with a saw blade slot allowing a saw blade of a cutting device to pass therethrough. The cutting device having a motor and a cutting unit is fixed to the base plate. The base plate has a pair of planar surfaces, namely, a bottom surface and an upper surface. The saw blade slot is surrounded by the base plate. A protruding portion of the saw blade that protrudes from the bottom surface side of the saw blade slot can be protected by being covered with a saw blade guard. The saw blade guard is connected to a linkage mechanism. When the cutting device is pivotally moved in association with pivotal movement of the base plate so that the saw blade is positioned closer to a workpiece, the protruding portion of the saw blade that is covered with the saw blade guard is gradually reduced. The protruding portion of the saw blade is gradually exposed to the atmosphere, and thus, the workpiece can be cut by the exposed portion of the saw blade.

SUMMARY

However, in the conventional cutting apparatus described above, the linkage mechanism that is connected to the saw blade guard has a complex structure. Accordingly, a simple mechanism is required to allow the portion of the saw blade that is initially brought into contact with the workpiece not to be covered with the saw blade guard.

In view of the foregoing, it is an object of the present invention to provide a cutting apparatus having a simple mechanism allowing a portion of a saw blade that is initially brought into contact with the workpiece not to be covered with a saw blade guard, and to provide a cutting apparatus that detachably mounts a cutting device and is capable of improving a visibility of the saw blade during a cutting operation.

In order to attain the above and other objects, the present invention provides a cutting apparatus including a cutting device and a base section. The cutting device includes a motor, a circular saw blade, a housing, and a base plate. The circular saw blade is driven by the motor to cut a workpiece. The housing rotatably supports the circular saw blade and accommodates the motor. The base plate is connected with the housing and is formed with an opening into which the circular saw blade is inserted. The base plate includes a main base plate connected with the housing and a sub base plate detachably mounted on the main base plate. The base section supports the workpiece. The cutting device is detachably mounted on the base section and is pivotably supported by the base section to be moved toward and away from the base section to cut the workpiece.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
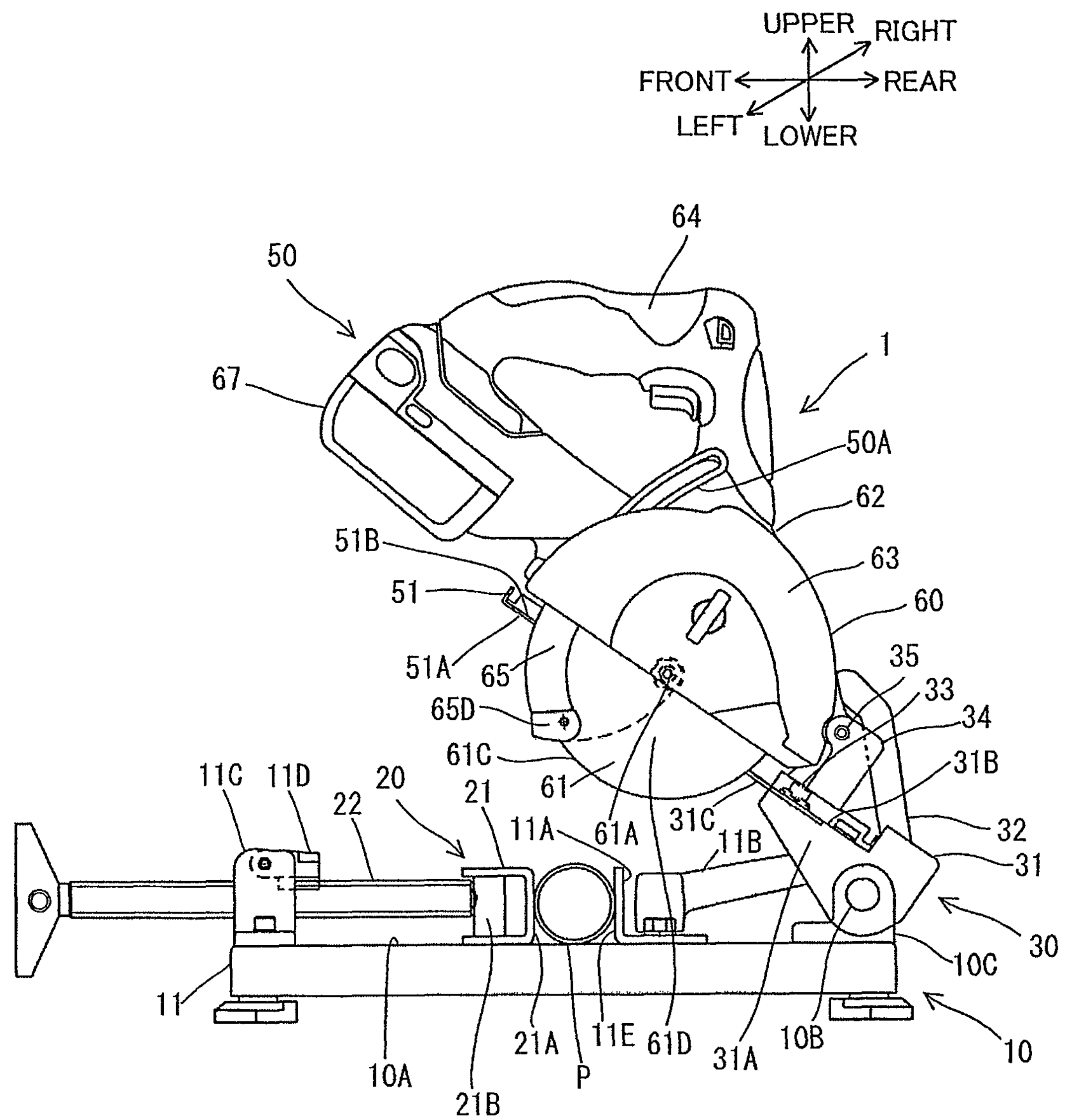
FIG. 1 is a side view of a cutting apparatus according to a first embodiment of the present invention.

A cutting apparatus according to a first embodiment of the present invention will be described while referring to FIGS. 1 to 7, 10 to 12, 19, and 20. As shown in FIG. 1, a cutting apparatus 1 serves as a electrical power apparatus for cutting a workpiece P. The cutting apparatus 1 includes a fixed surface plate 10 and a circular saw device 50. The fixed surface plate 10 includes a base 11, a vise device 20, and a support portion 30. The circular saw device 50 corresponds to a cutting device. The fixed surface plate 10 corresponds to a base section.

The fixed surface plate 10 will be described with reference to FIGS. 1, 2, and 10 to 12.

The base 11 has an upper surface 10A for mounting a tubular workpiece P thereon, a pin 10B for connecting the base 11 to the support portion 30, a pin support portion 10C for supporting the pin 10B, and a chain 11G. The pin 10B is configured such that an axial direction thereof is oriented in a direction parallel to the upper surface 10A.

In the axial direction of the pin 10B, a side where the workpiece P is positioned relative to the pin 10B is defined as "front," and a side opposite to the "front" is defined as "rear." An upper direction of the upper surface 10A is defined as "upper," and a side opposite to the "upper" is defined as "lower." A direction perpendicular to a front-to-rear direction as well as perpendicular to an upper-to-lower direction is defined as a left-to-right direction. A direction from a reverse side of paper on which FIG. 1 is drawn to an obverse side of the paper is defined as "left", and a direction from the obverse side of the paper to the reverse side of the paper is defined as "right."

Further, the pin support portion 10C is fixed to the upper surface 10A. The chain 11G is hooked to a hook (not shown) of the circular saw device 50, so that the circular saw device 50 can be maintained at a lower limit position of its pivotal movement. The chain 11G serves as a maintaining unit, and accordingly, portability in carrying the cutting apparatus 1 can be improved.

Figure 7:
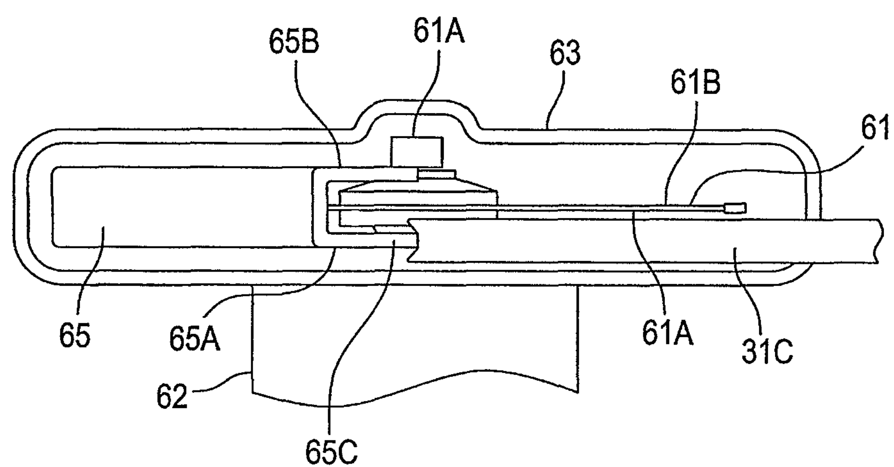
FIG. 7 is a bottom plan view showing a substantial part of a support member for supporting a safety cover provided in the cutting apparatus according to the first embodiment.

The upper surface 10A of the base 11 is formed with an aperture 10D. The base 11 is provided with the vise device 20. A fence (fixed vise) 11A is disposed on the upper surface 10A and is movable relative to the base 11. When the circular saw device 50 is pivotally moved fully toward the fixed surface plate 10, a saw blade 61 described later is moved into the aperture 10D. The saw blade 61 has one side surface 61A and another side surface 61B as shown in FIG. 7.

The fence 11A is a substantially L-shaped in cross-section, as shown in FIG. 1. The fence 11A has a bottom portion extending in a direction parallel to the upper surface 10A and a fence portion extending upwardly from the bottom portion. The fence 11A has a first abutment surface 11E on which the workpiece P abuts. The fence 11A is pivotally movable about a pivot shaft 11F (see FIG. 10). The bottom portion of the fence 11A is formed with an arcuate slot 11*a* whose center is coincident with the pivot shaft 11F (shown in FIGS. 2 and 10). Within the slot 11*a*, a lever 11B is provided. The fence 11A is immovable relative to the base 11 when the lever 11B is fastened. By unfastening the lever 11B, a shaft 11B1 of the lever 11B is relatively movable in the slot 11*a*. In other words, the fence 11A is pivotally movable about the pivot shaft 11F while maintaining a position of the fence portion to be perpendicular to the upper surface 10A. Further, the bottom portion of the fence 11A has a scale along the slot 11*a*. When the fence 11A is pivotally moved about the pivot shaft 11F, a pivot angle can be obtained from the scale and a mark indicated on the upper surface 10A.

The vise device 20 includes a workpiece abutment section 21 and a support portion 22 for supporting the workpiece abutment section 21. The workpiece abutment section (movable vise) 21 has a second abutment surface 21A. The support portion 22 is a substantially rod shaped and extends in a direction parallel to the upper surface 10A. The workpiece abutment section 21 is connected to a rear end portion of the support portion 22 by a shaft 21B extending in the upper-to-lower direction.

The workpiece abutment section 21 is pivotally movable about the shaft 21B relative to the support portion 22. The support portion 22 has an intermediate portion, and the intermediate portion is engageable with a fixing portion 11C that is fixedly provided on the upper surface 10A. The fixing portion 11C is provided with a lever 11D. The support portion 22 is fixed to the base 11 via the fixing portion 11C by the pivotal downward movement of the lever 11D. By unfastening the lever 11D, the workpiece abutment section 21 and the support portion 22 are movable in the front-to-rear direction depending on the size of the workpiece P.

The lever 11B is unfastened to adopt a desired pivot angle of the fence 11A. The lever 11B is then fastened to fix the fence 11A to the base 11. The lever 11D is unfastened to move the support portion 22 and the workpiece abutment section 21 rearward. When the workpiece abutment section 21 is brought into abutment with the workpiece P, the lever 11D is fastened. The workpiece P is pinched between the fence 11A and the workpiece abutment section 21 so as to be fixed to the base 11. When the circular saw device 50 is pivotally moved toward the fixed surface plate 10, a lower portion of the saw blade 61 intersects with a region between a surface extending from the first abutment surface 11E and a surface extending from the second abutment surface 21A and intersects with the upper surface 10A.

The support portion 30 mainly includes a pivoting support portion 31, as shown in FIG. 1. The pivoting support portion 31 has a lower portion connected to the pin support portion 10C via the pin 10B. Accordingly, the support portion 30 is pivotally movable about the pin 10B relative to the upper surface 10A. At an upper portion of the pivoting support portion 31, a mounting portion 31A is provided. The mounting portion 31A is capable of fixing the circular saw device 50 thereonto.

Figure 10:
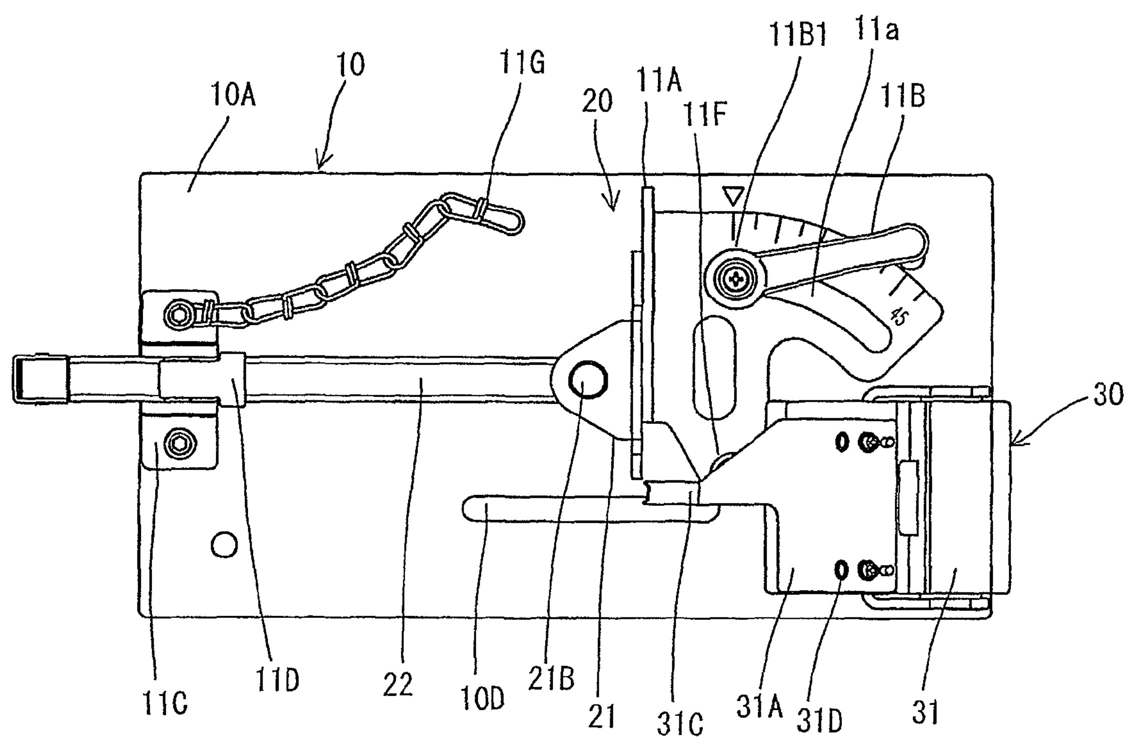
FIG. 10 is a top plan view of a fixed surface plate (base section) provided in the cutting apparatus according to the first embodiment.
Figure 11:
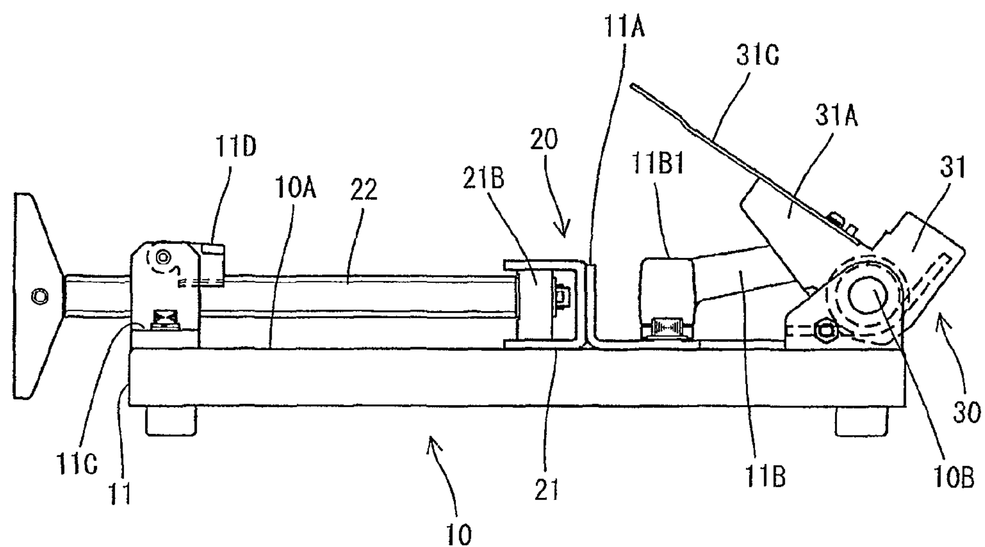
FIG. 11 is a side view of the fixed surface plate (base section) provided in the cutting apparatus according to the first embodiment.

The mounting portion 31A has a substantially planar upper surface 31B. As shown in FIG. 10, The upper surface 31B is formed with a pair of female threads 31D.

The mounting portion 31A is provided with a cover support member 31C for supporting a safety cover 65. The cover support member 31C is fixed to the upper surface 31B by screws. As shown in FIG. 7, the cover support member 31C is formed in a substantially elongated rectangular plate shape, and extends substantially frontward from the upper surface 31B in a direction parallel to the upper surface 31B. As described later, the cover support member 31C has an extending end portion abuttable with the safety cover 65. The cover support member 31C serves as an abutment member.

Figure 12:
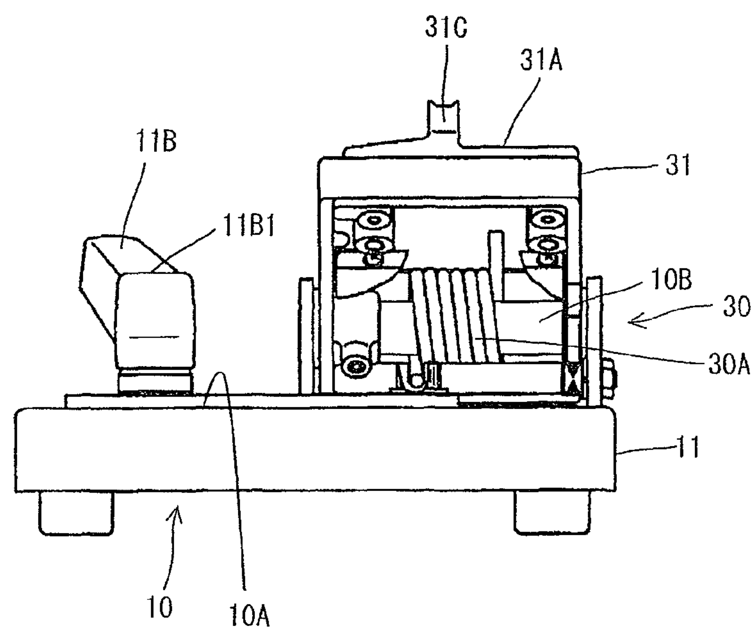
FIG. 12 is a rear view of the fixed surface plate (base section) provided in the cutting apparatus according the first embodiment.

Further, as shown in FIG. 12, the support portion 30 includes a coil spring 30A coiled around the pin 10B. Since the pivoting support portion 31 is normally biased upward by the coil spring 30A, the mounting portion 31A is normally directed upward. Accordingly, workability in mounting the circular saw device 50 on the mounting portion 31A can be improved.

Further, the pivoting support portion 31 has a restriction portion 32 at a rear side thereof. The restriction portion 32 linearly extends frontward from the rear side of the pivoting support portion 31. The restriction portion 32 has a tip end portion extending in a direction parallel to the upper surface 31B. As shown in FIG. 1, a distal end of the restriction portion 32 is brought into contact with a rear portion of a saw cover 63 described later when the circular saw device 50 is mounted on the mounting portion 31A.

Next, the circular saw device 50 will be described. In the present embodiment, the circular saw device 50 is mounted on the fixed surface plate 10 and used as a stationary type. However, the circular saw device 50 can be independently used as a portable type. The circular saw device 50 mainly includes a base plate 51, and a saw blade section 60 pivotally movably connected to the base plate 51.

Here, the base plate 51 will be described while referring to FIGS. 6A to 6D. The base plate 51 includes a main base plate 52, and a sub base plate 53 detachable from or attachable to the main base plate 52. The base plate 51 has a bottom surface 51A, and an upper surface 51B provided at a position opposite to the bottom surface 51A. The sub base plate 53 is attached to the main base plate 52 when the circular saw device 50 is used as the portable type. The bottom surface 51A is brought into contact with the workpiece P when the workpiece P is cut. The base plate 51 is formed with an opening 51*a* through which the saw blade 61 is projected downward beyond the bottom surface 51A. The main base plate 52 is formed in a substantially rectangular shape, and formed with a cutout portion. The cutout portion is formed by cutting one of four corner in the rectangular shape.

The sub base plate 53 has a shape in conformance with the cutout portion of the main base plate 52. When the sub base plate 53 is attached to the main base plate 52, the base plate 51 has a substantially rectangular shape. Attachment of the sub base plate 53 to the main base plate 52 defines the opening 51*a*. That is, the sub base plate 53 defines the opening 51*a*. Further, the main base plate 52 is positioned at one side surface side (the right side) of the saw blade 61, while the sub base plate 53 is positioned at another side surface side (the left side) of the saw blade 61.

The main base plate 52 has a pair of annular portions 52A on an upper surface thereof (the upper surface 51B of the base plate 51). The sub base plate 53 has a pair of pins 53A extending in a direction toward the main base plate 52. The sub base plate 53 is attached to the main base plate 52 through the pair of the pin 53A. More specifically, the pair of the pins 53A is inserted into the pair of the annular portions 52A. A distal end of a bolt 52B is brought into contact with each of the pins 53A, and the bolt 52B is fastened in order to fix the pin 53A to the annular portion 52A. The sub base plate 53 is thus fixed to the main base plate 52.

The upper surface 51B of the base plate 51 (the upper surface of the main base plate 52) is provided with a ruler attachment portion 51C for attaching a parallel ruler when using the circular saw device 50 as portable type, and a mark 51D positioned on an extended line of the saw blade 61 to indicate a position of the saw blade 61. A support portion 34 is disposed at a rear end portion of the base plate 51. The support portion 34 is configured to connect the saw blade section 60 to the base plate 51 so that the saw blade section 60 is pivotally movable relative to the base plate 51. The saw blade section 60 is pivotally movably connected to the support portion 34 about a pivot pin 35 extending in the left-to-right direction.

Further, a front end portion of the main base plate 52 is provided with a link 50A. When the circular saw device 50 is used as portable type, the link 50A is used for adjusting an amount of protrusion of the saw blade 61 from the bottom surface 51A, by pivotally moving the saw blade section 60 relative to the base plate 51.

Further, when the circular saw device 50 is used as stationary type, as described above, the tip end portion of the restriction portion 32 is in contact with the saw cover 63. Pivotal movement of the saw blade section 60 is therefore regulated (shown in FIG. 1). Accordingly, even if the saw blade section 60 is not fixed to the base plate 51 by the link 50A, cutting operation can be performed while maintaining the protrusion amount of the saw blade 61 from the bottom surface 51A to the maximum.

When the circular saw device 50 is used as portable type, the sub base plate 53 is attached to the main base plate 52. Because the main base plate 52 and the sub base plate 53 constitute the base plate 51, an abutment area of the base plate 51 with the workpiece P is increased. Hence, the base plate 51 is slidingly movable on the workpiece P with stability.

When the circular saw device 50 is mounted on the fixed surface plate 10 to use as stationary type, the sub base plate 53 is removed from the main base plate 52. Removal of the sub base plate 53 from the main base plate 52 enables the user to visually recognize a portion of the saw blade 61 that is cutting the workpiece P and a cutting position on the workpiece P, through the cutout portion of the main base plate 52 that corresponds to a space on which the sub base plate 53 is provided. Accordingly, the base plate 51 does not interfere with visual recognition of the portion of the saw blade 61 that is cutting the workpiece P and the cutting position on the workpiece P. As a result, visibility of the saw blade 61 and the cutting position on the workpiece P can be improved to enhance workability.

Further, the rear end portion of the main base plate 52 is formed with a pair of female threads 52*a*. The female threads

52*a* are spaced apart from each other in the left-to-right direction. By threadingly engaging the male threads 33 (shown in FIG. 5) with the female threads 52*a* and the female threads 31D (FIG. 10), the main base plate 52 is fixed to the mounting portion 31A.

Figure 2:
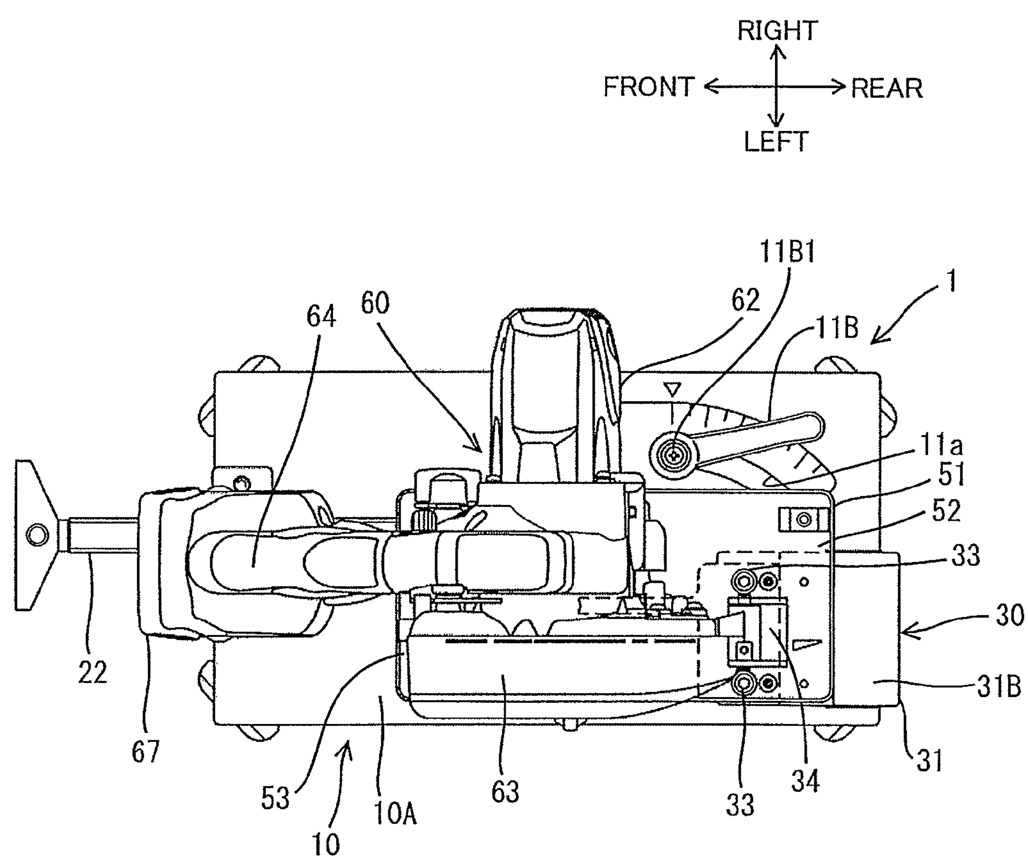
FIG. 2 is a top plan view of the cutting apparatus according to the first embodiment.

As shown in FIG. 2, the saw blade section 60 includes the saw blade 61, a housing 62, and the saw cover 63. The housing 62 and the saw cover 63 serve as an outer frame of the saw blade section 60. The housing 62 is positioned at the one side surface side (the right side) of the saw blade 61, and rotatably supports the saw blade 61. Within the housing 62, a motor (not shown) for rotary driving the saw blade 61 and a power transmission mechanism (not shown) for transmitting rotations of the motor are accommodated.

The motor is positioned at the one side surface side (the right side) of the saw blade 61, while the sub base plate 53 is positioned at the another side surface side (the left side) of the saw blade 61. The motor is not disposed at a side the same as the side that the sub base plate 53 is disposed. Accordingly, at the another side surface side (the left side) of the saw blade 61, further improvement of visibility of the saw blade 61 can be attained.

The housing 62 has an upper portion provided with a handle 64. The handle 64 is provided with a trigger switch 64*a*. The user presses the trigger switch 64*a* for driving the motor.

The saw cover 63 covers an upper half of an outer circumferential portion 61C of the saw blade 61. The saw cover 63 is integrally formed with a left side portion of the housing 62. The saw cover 63 is connected to the support portion 34 by the pivot pin 35, so that the housing 62 (the saw blade section 60) is pivotally movable relative to the base plate 51. Further, a release mechanism (not shown) is provided between the base plate 51 and the saw blade section 60 to fix a position of pivotal movement of the saw blade section 60 with respect to the base plate 51 and to release the fixed position.

Figure 19:
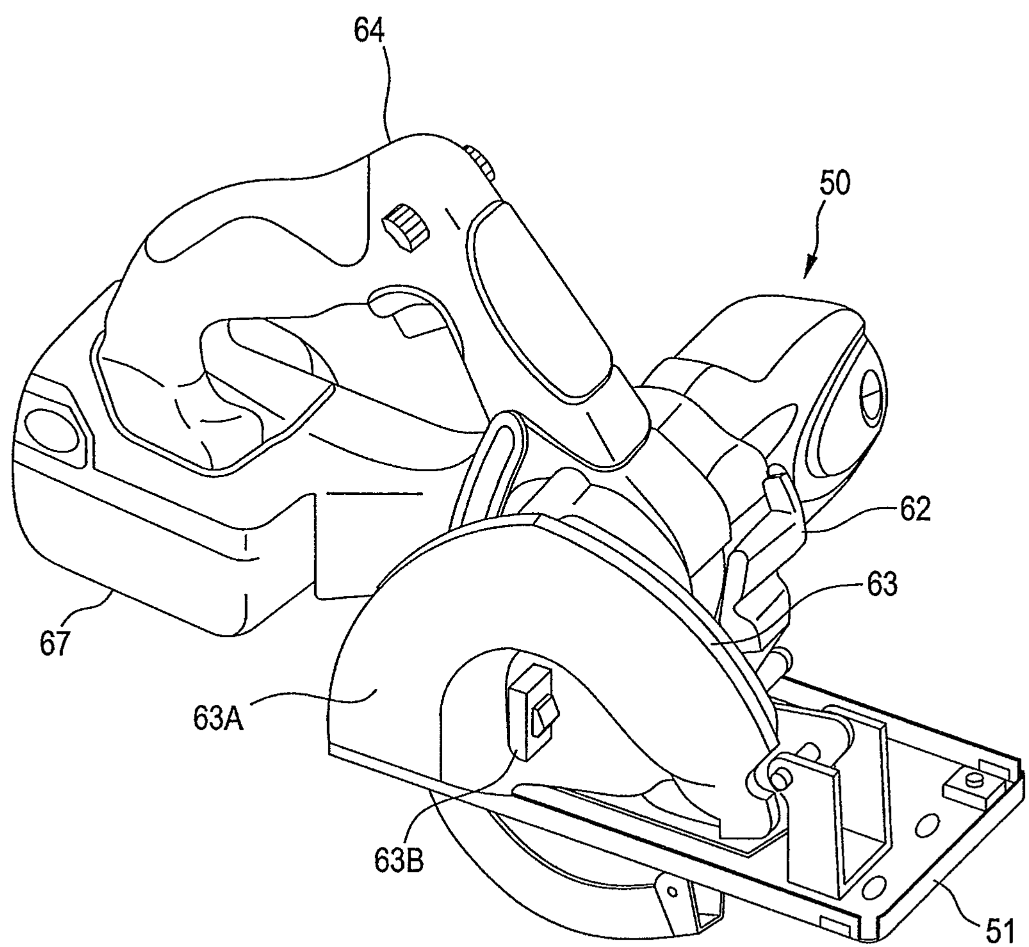
FIG. 19 is a perspective view of the circular saw device constituting the cutting apparatus according to the second embodiment.
Figure 20:
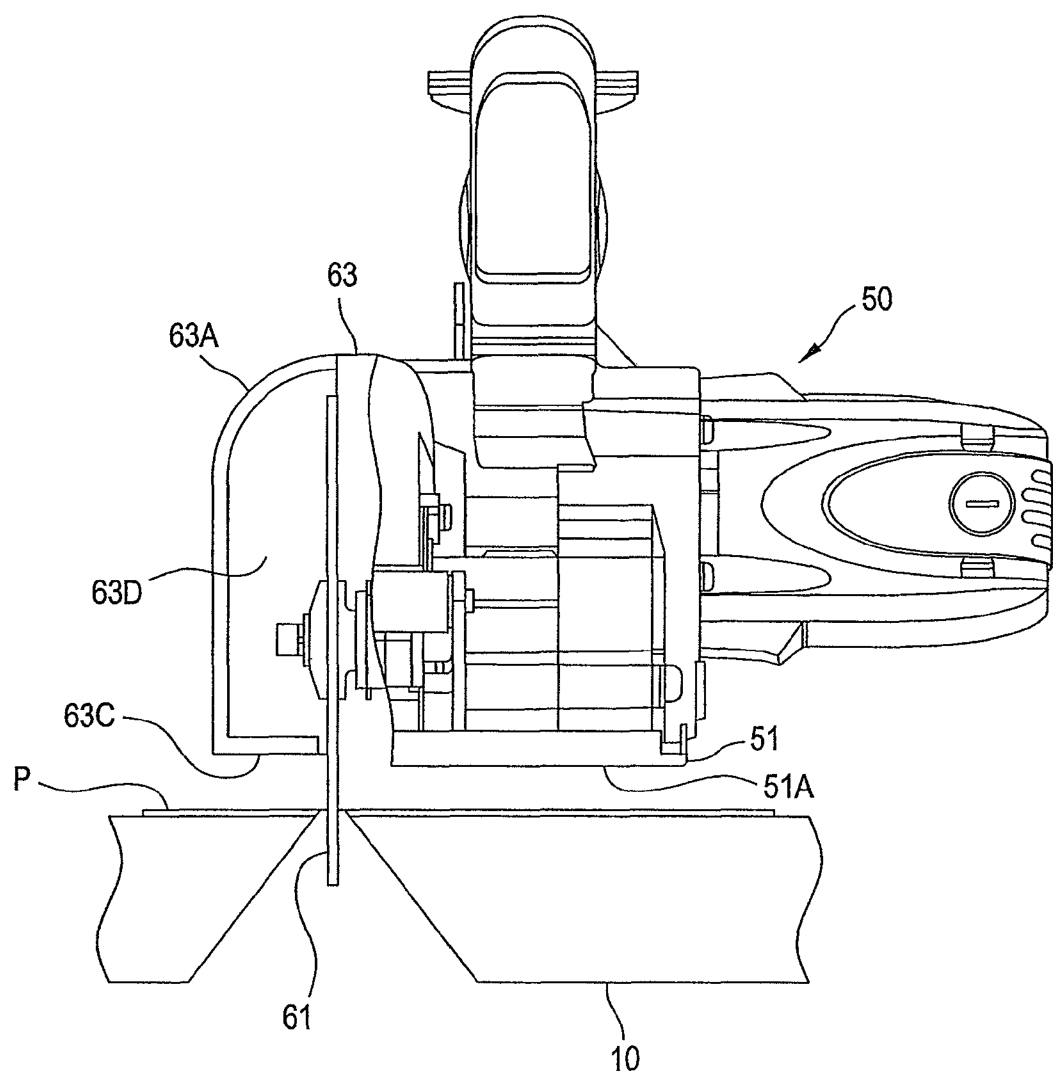
FIG. 20 is a partial cross-sectional view of the circular saw device constituting the cutting apparatus according to the second embodiment.

As shown in FIGS. 19 and 20, a dust collection cover 63A is provided at a left side of the saw cover 63. The dust collection cover 63A is detachably attached to the saw cover 63 by a knob 63B. The dust collection cover 63A is disposed above the base plate 51 and covers a part of another side surface 61B of the saw blade 61. The dust collection cover 63A has a bottom surface 63C oriented in a direction parallel to the bottom surface 51A. The dust collection cover 63A defines a space 63*d* for collecting cutting chip.

Figure 13A:
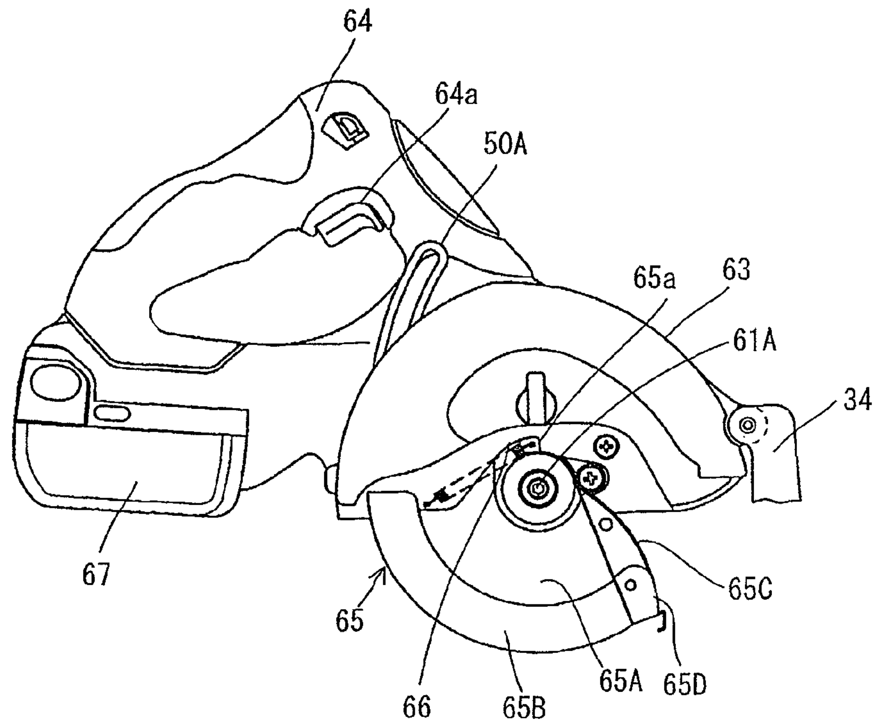
FIG. 13A is a side view of a saw blade section provided in the cutting apparatus according to the first embodiment showing an initial position of the safety cover.
Figure 13B:
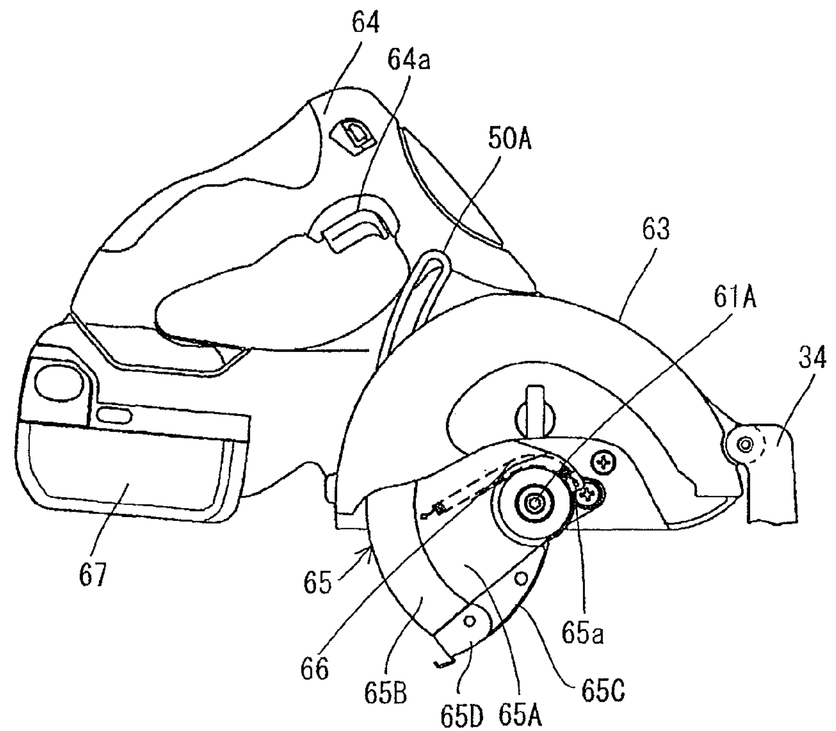
FIG. 13B is a side view of the saw blade section provided in the cutting apparatus according to the first embodiment showing a state when the safety cover is pivotally moved from the initial position.

Further, as shown in FIG. 13A, the saw blade section 60 is provided with the safety cover 65 for covering a lower half portion of the saw blade 61 when the circular saw device 50 is not in use. The safety cover 65 includes a first cover section 65A positioned at the right side of the saw blade 61 and a second cover section 65B positioned at the left side of the saw blade 61. In FIGS. 13A and 13B, the saw blade 61 is omitted for the sake of simplicity.

The first cover section 65A has a generally sector shape. The first cover section 65A is attached to the saw cover 63 and pivotally movable about the saw blade shaft 61A. The first cover section 65A includes an attaching portion 65*a* to which a spring 66 is attached and a supported portion 65C. The attaching portion 65*a* is positioned in the vicinity of the saw blade shaft 61A. The second cover section 65B is provided only at a portion opposite to the outer circumferential portion 61C of the saw blade 61. An outer circumferential edge of the first cover section 65A is integral with an outer circumferential edge of the second cover section 65B. Accordingly, as shown in FIG. 7, the safety cover 65 is a substantially U-shaped in cross-section along a imaginary plane perpendicular to one side surface 61A of the saw blade 61 so as to cover the saw blade 61 from one side surface 61A to another side surface 61B. Further, the safety cover 65 has one end portion 65D in a circumferential direction of the saw blade 61. The safety cover 65 is pivotally movable along the side surfaces 61A and 61B of the saw blade 61 such that the safety cover 65 projects downward beyond the bottom surface 51A to cover a part of the outer circumferential portion 61C of the saw blade 61. The safety cover 65 corresponds to a protection member.

Abutment of the cover support member 31C with the supported portion 65C of the safety cover 65 enables the safety cover 65 to be supported at a predetermined pivotal movement position. Therefore, the cover support member 31C, the safety cover 65, and the motor, which may become obstacles in visually recognizing the saw blade 61 during the cutting operation, can be disposed collectively at the one side surface side (the right side) of the saw blade 61. At the another side surface side (the left side) of the saw blade 61, parts and components which may interfere with visual recognition of the saw blade 61 in cutting the workpiece P can be reduced. Consequently, visibility of the saw blade 61 during the cutting operation can be improved, and workability can also be enhanced.

In the vicinity of a pivot shaft of the safety cover 65, the spring 66 is provided. The spring 66 is an example of a biasing member. The spring 66 has one end that is attached to the attaching portion 65*a* and another end that is attached to a portion opposite to the saw blade 61 of the saw blade section 60. The spring 66 urges the safety cover 65 so as to pivotally move the safety cover 65 in a counterclockwise direction in FIG. 13A. In other words, the spring 66 urges the safety cover 65 so that the safety cover 65 is pivotally moved in a direction that a covering amount increases. The covering amount represents an amount that the safety cover 65 covers the outer circumferential portion 61C of a protruding portion 61D of the saw blade 61 protruding from the bottom surface 51A. The one end portion 65D is positioned at a leading end of the safety cover 65 in the direction that the covering amount increases.

When not affected by an external force, the safety cover 65 is pivotally moved toward an initial position (as shown in FIG. 13A) by a biasing force of the spring 66. When the safety cover 65 is in the initial position, the safety cover 65 covers the outer circumferential portion 61C of the protruding portion 61D in a first predetermined amount. When the circular saw device 50 is used as portable type, the spring 66 can minimize an amount of the saw blade 61 exposed to an atmosphere during the cutting operation so as to prevent the cutting chip from scattering as much as possible.

When the circular saw device 50 is used as stationary type, the cover support member 31C abuts the supported portion 65C to pivotally moves the safety cover 65 against the biasing force of the spring 66 as shown in FIG. 13B. Only when the supported portion 65C is brought into abutment with the cover support member 31C to pivotally move the safety cover 65, the spring 66 is stretched. In the initial position of the safety cover 65 (as shown in FIG. 13A), the spring 66 is configured not to be stretched. Accordingly, the service life of the spring 66 can be prolonged.

As shown in FIG. 1, a battery pack 67 is detachably mounted in a lower portion of the handle 64. The battery pack 67 is positioned in opposition to the pin 10B with respect to the saw blade 61. That is, when the circular saw device 50 is mounted on the fixed surface plate 10, the battery pack 67 is provided at a position spaced farther apart from a pivot axis (the pin 10B) of the circular saw device 50 than the saw blade 61. Accordingly, when the user pivotally moves the circular saw device 50, the weight of the battery pack 67 helps the user to move the circular saw device 50 toward the fixed surface plate 10 with less power. Further, by using the battery pack 67 as power source of the motor, portability of the circular saw device 50 and the cutting apparatus 1 can be improved.

In a case that the circular saw device 50 is used as portable type, the safety cover 65 is automatically pivotally moved to expose the lower half portion of the saw blade 61 to the atmosphere by contacting with the workpiece P when the workpiece P is cut frontward from its rear edge. Alternatively, in a case that the circular saw device 50 is used as stationary type, the supported portion 65C of the safety cover 65 is brought into abutment with the distal end portion of the cover support member 31C.

Next, a process to mount the circular saw device 50 as stationary type on the fixed surface plate 10 will be described.

Initially, before the main base plate 52 of the circular saw device 50 is mounted on the mounting portion 31A, the user pivotally moves the safety cover 65 until the protruding portion 61D of the saw blade 61 is exposed to the atmosphere greater than a second predetermined amount described later. Supporting the safety cover 65 in this state, the user mounts the main base plate 52 on the mounting portion 31A to fix the main base plate 52 on the mounting portion 31A by the male threads 33. Then, the user releases the safety cover 65. The safety cover 65 is pivotally moved by the biasing force of the spring 66, so that the supported portion 65C of the safety cover 65 is brought into abutment with the distal end portion of the cover support member 31C. Abutment of the supported portion 65C with the cover support member 31C prevents the safety cover 65 from pivotally moving further.

At a position of the safety cover 65 when the supported portion 65C of the safety cover 65 is in abutment with the distal end portion of the cover support member 31C, the covering amount of the safety cover 65 that covers the saw blade 61 is equivalent to the second predetermined amount. The second predetermined amount corresponds to a predetermined amount. Here, the second predetermined amount represents an amount that, when the circular saw device 50 pivotally moves and the safety cover 65 is in contact with a portion of the fixed surface plate 10 or the workpiece P, the one end portion 65D of the supported portion 65C is positioned in a region between the surface extending from the first abutment surface 11E and the surface extending from the second abutment surface 21A. In other words, the safety cover 65 exposes a portion of the saw blade 61 that is initially brought into contact with the workpiece P when cutting the workpiece P, when the safety cover 65 covers the outer circumferential portion 61C of the protruding portion 61D of the saw blade 61 by the second predetermined amount. That is, the safety cover 65 exposes a portion of the saw blade 61 spaced farthest apart from the bottom surface 51A, when the safety cover 65 covers the outer circumferential portion 61C of the protruding portion 61D of the saw blade 61 by the second predetermined amount. More preferably, the one end portion 65D is positioned at a position between a position that the one end portion 65D is opposite to a portion of the saw blade 61 spaced farthest apart from the bottom surface 51A and a position that the one end portion 65D intersects with the surface extending from the second abutment surface 21A, when the safety cover 65 covers the outer circumferential portion 61C of the protruding portion 61D by the second predetermined amount. Further, the safety cover 65 may cover at least a part of the outer circumferential portion 61C of the protruding portion 61D of the saw blade 61, when the safety cover 65 covers the outer circumferential portion 61C of the protruding portion 61D by the second predetermined amount.

The second predetermined amount is described as above. Accordingly, when the circular saw device 50 is pivotally moved to cut the workpiece P with the saw blade 61, the exposed portion of the saw blade 61 is properly brought into contact with the workpiece P to cut the workpiece P. Accordingly, operability of the circular saw device 50 can be improved. Further, the safety cover 65 covering the saw blade 61 with the second predetermined amount can prevent cutting chip from scattering. Further, in conjunction with pivotal movement of the circular saw device 50, the safety cover 65 can be pivotally moved automatically.

Further, the second predetermined amount is defined when a part of the outer circumferential portion 61C of the protruding portion 61D of the saw blade 61 is covered with the safety cover 65. In other words, the entire protruding portion 61D is not exposed to the atmosphere. For this reason, as described above, compared to a case where the safety cover 65 is supported by the cover support member 31C so as to expose the entire protruding portion 61D of the saw blade 61 to the atmosphere, a force which acts on the spring 66 against the biasing force of the spring 66 can be reduced. Accordingly, the service life of the spring 66 can be prevented from decreasing.

An air passage (not shown) extending in a direction toward the saw cover 63 is formed between an inner peripheral surface of the housing 62 and the motor. A fan (not shown) is disposed in the housing 62 coaxially with a rotation shaft (not shown) of the motor, and rotates in association with rotation of the motor. Air is introduced into the housing 62 through an intake port (not shown) formed on the housing 62, passes through the air passage, and cools down the motor. The cutting chip produced during the cutting operation is introduced into the dust collection cover 63A by air flow generated by the fan and rotation of the saw blade 61. Deposition of the cutting chip around a cutting position of the workpiece P (around the outer circumferential portion 61C of the saw blade 61) can be avoided. Accordingly, visibility in the vicinity of the outer circumferential portion 61C of the saw blade 61 can be improved.

When the circular saw device 50 is mounted on the fixed surface plate 10 for use as stationary type to cut the workpiece P, as shown in FIG. 1, the workpiece P is initially fixed to the fixed surface plate 10 by the vise device 20 so as not to move. Concurrently, the circular saw device 50 is fixed to the mounting portion 31A of the fixed surface plate 10. The supported portion 65C of the safety cover 65 is brought into abutment with the cover support member 31C to be pivotally moved by the second predetermined amount. The safety cover 65 can be easily supported by the cover support member 31C, because the cover support member 31C is provided on the mounting portion 31A as described above.

Figure 3:
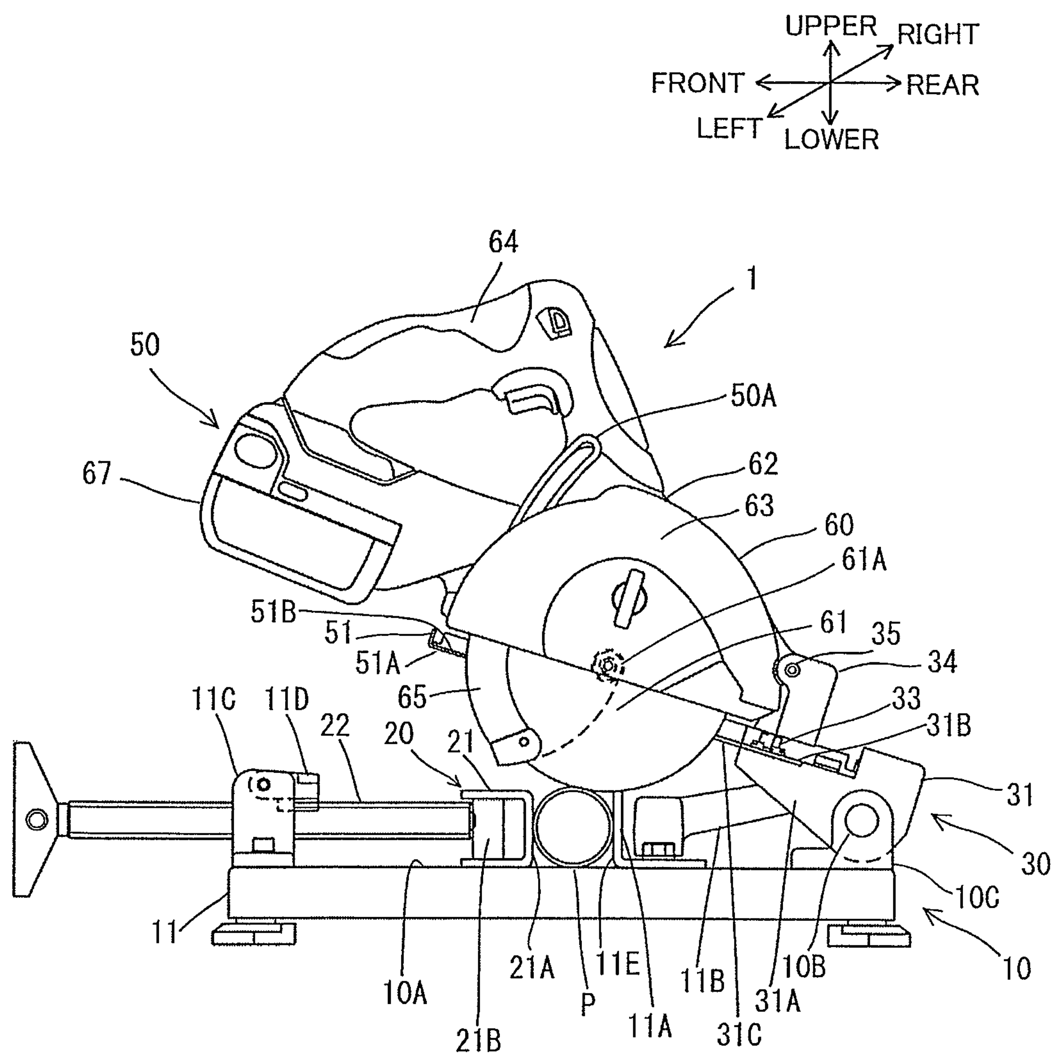
FIG. 3 is a side view of the cutting apparatus according to the first embodiment showing a state when the cutting apparatus is just about to cut a workpiece.

Next, the user holds the handle 64 to pivotally move the circular saw device 50 in a direction such that the circular saw device 50 comes closer to the fixed surface plate 10, as shown in FIG. 3. Since the safety cover 65 is supported by the cover support member 31C, the portion of the saw blade 61 opposite to the workpiece P is exposed to the atmosphere without being covered with the safety cover 65. The safety cover 65 is not positioned between the workpiece P and the saw blade 61 when the workpiece P is cut, and accordingly, the safety cover 65 does not interfere with the cutting operation. As a result, workability of the cutting operation can be improved.

Figure 4:
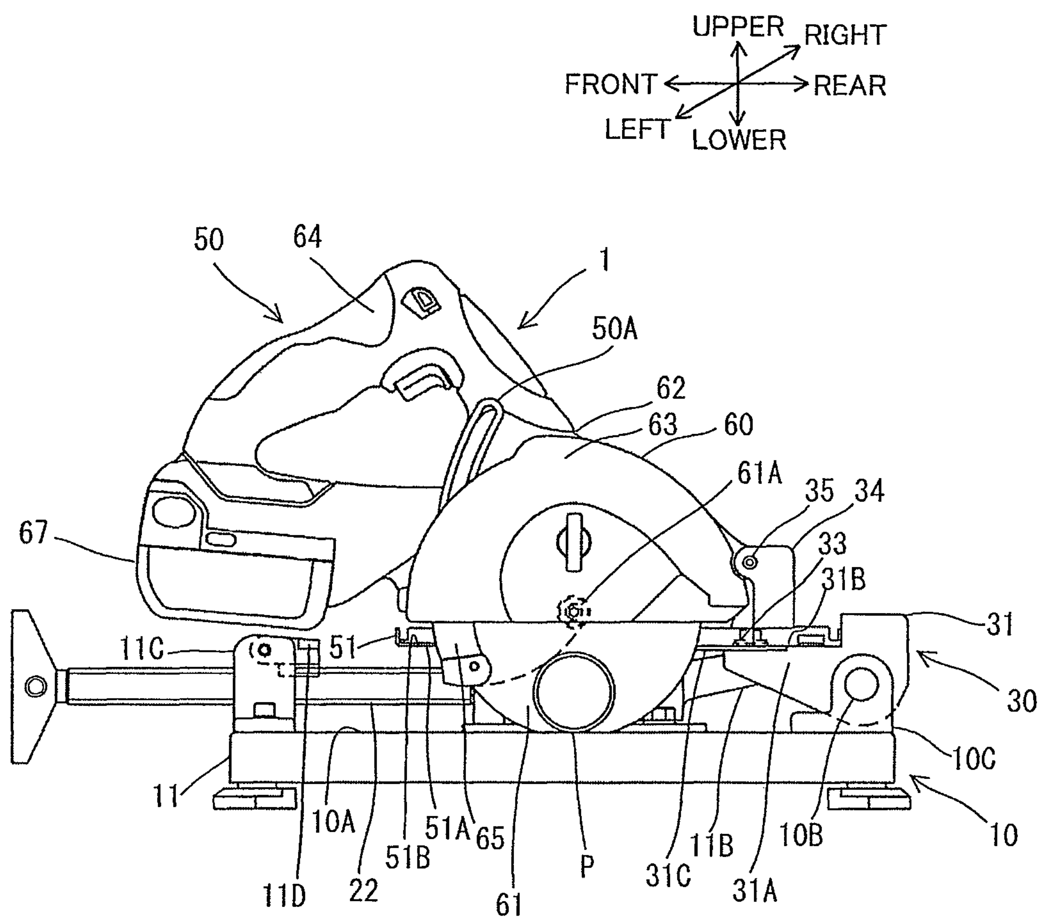
FIG. 4 is a side view of the cutting apparatus according to the first embodiment showing a state when the cutting tool has cut the workpiece.
Figure 5:
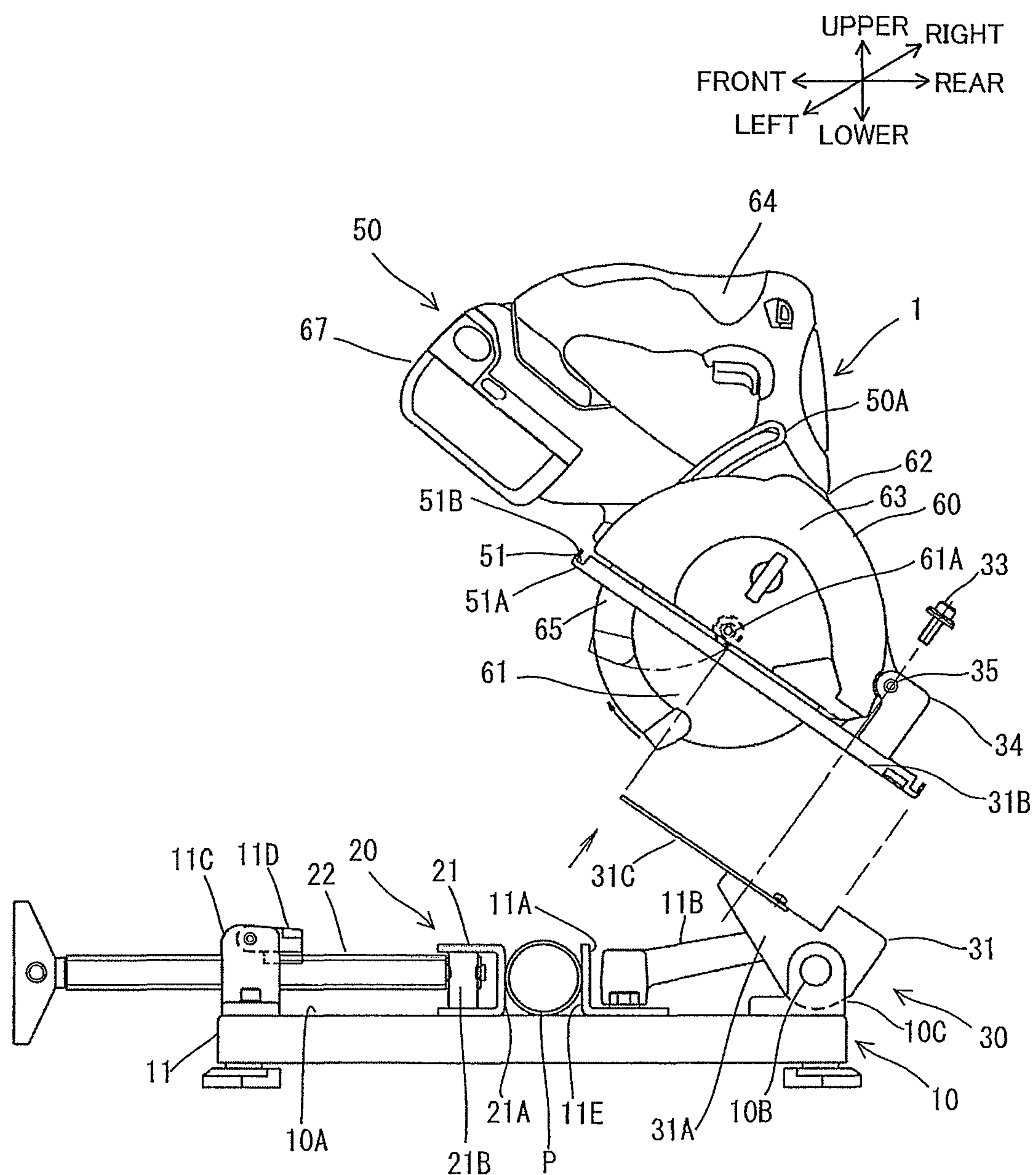
FIG. 5 is an exploded side view of the cutting apparatus according to the first embodiment.
Figure 6A:
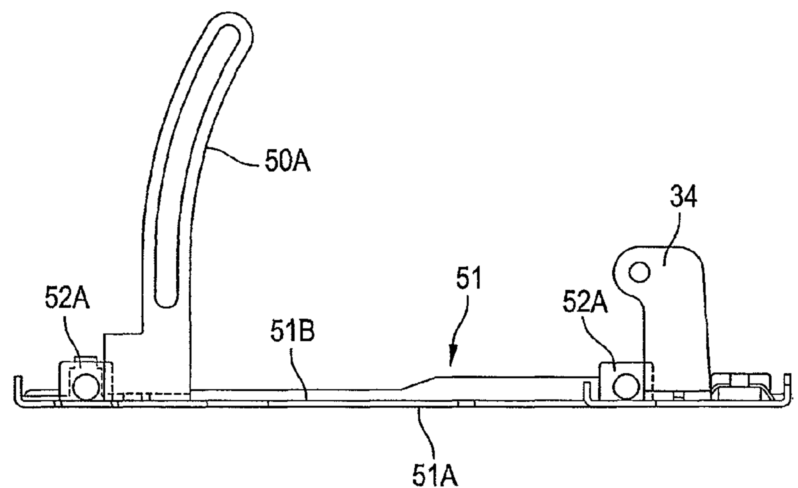
FIG. 6A is a side view of a base plate provided in the cutting apparatus according to the first embodiment.
Figure 6B:
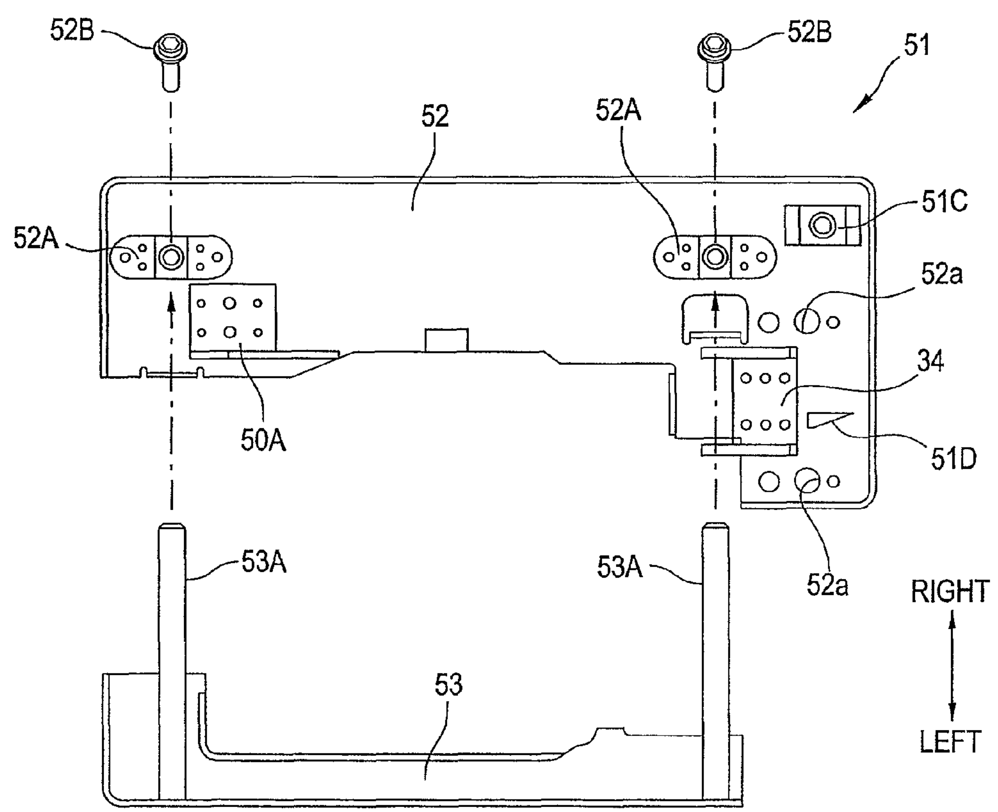
FIG. 6B is an exploded top plan view of the base plate provided in the cutting apparatus according to the first embodiment showing a state when a sub base section is removed from a main base section.
Figure 6C:
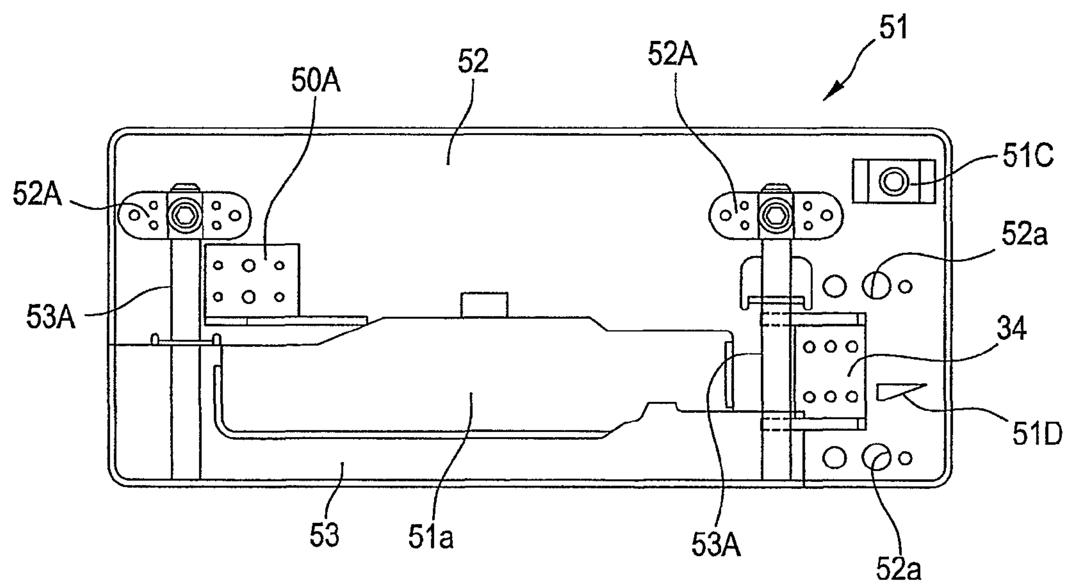
FIG. 6C is a top plan view of the base plate provided in the cutting tool according to the first embodiment showing a state when the sub base section is attached to the main base section.
Figure 6D:
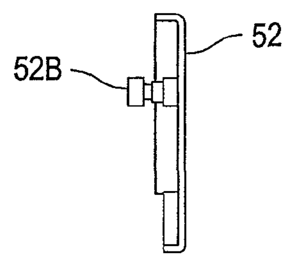
FIG. 6D is an exploded cross-sectional view of the base plate provided in the cutting apparatus according to the first embodiment.
Figure 6D:
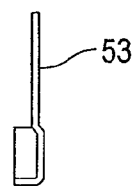

As shown in FIG. 4, the workpiece P is cut by the saw blade 61. When the saw blade section 60 is pivotally moved about the support portion 34 at the lower limit position, the saw blade 61 moves into the aperture 10D. The circular saw device 50 is capable of cutting the workpiece P having a width between two intersections of the upper surface 10A with the saw blade 61 (rear and front points of the saw blade 61 intersecting with the fixed surface plate 10).

When the circular saw device 50 is used as stationary type, the supported portion 65C of the safety cover 65 is brought into abutment with the cover support member 31C so as to be pivotally moved only with the second predetermined amount. Then, upon pivotal movement of the circular saw device 50, the safety cover 65 is brought into contact with the workpiece P or the upper surface 10A. The safety cover 65 is pivotally moved with an amount greater than the second predetermined amount. Since the safety cover 65 urged by the spring 66 is pivotally moved with an amount necessary for cutting the workpiece P, the service life of the spring 66 can be prevented from decreasing.

Further, the dust collection cover 63A is detachable from or attachable to the housing 62 (the saw cover 63). When the circular saw device 50 is fixed to the fixed surface plate 10 for use as stationary type, the dust collection cover 63A is attached to the housing 62 to collect the cutting chip. Alternatively, when the dust collection cover 63A is detached from the housing 62, the dust collection cover 63A prevents from contacting against the fixed surface plate 10. Accordingly, the circular saw device 50 can be tilted toward the fixed surface plate 10 at a greater angle.

Further, the dust collection cover 63A may be formed of transparent material. Deposition of the cutting chip in the dust collection cover 63A can be easily recognized, and degradation of visibility of the cutting position can be avoided. The dust collection cover 63A can be easily removed from the saw cover 63 by unfastening the knob 63B, since the dust collection cover 63A is attached to the saw cover 63 by the knob 63B.

Figure 14:
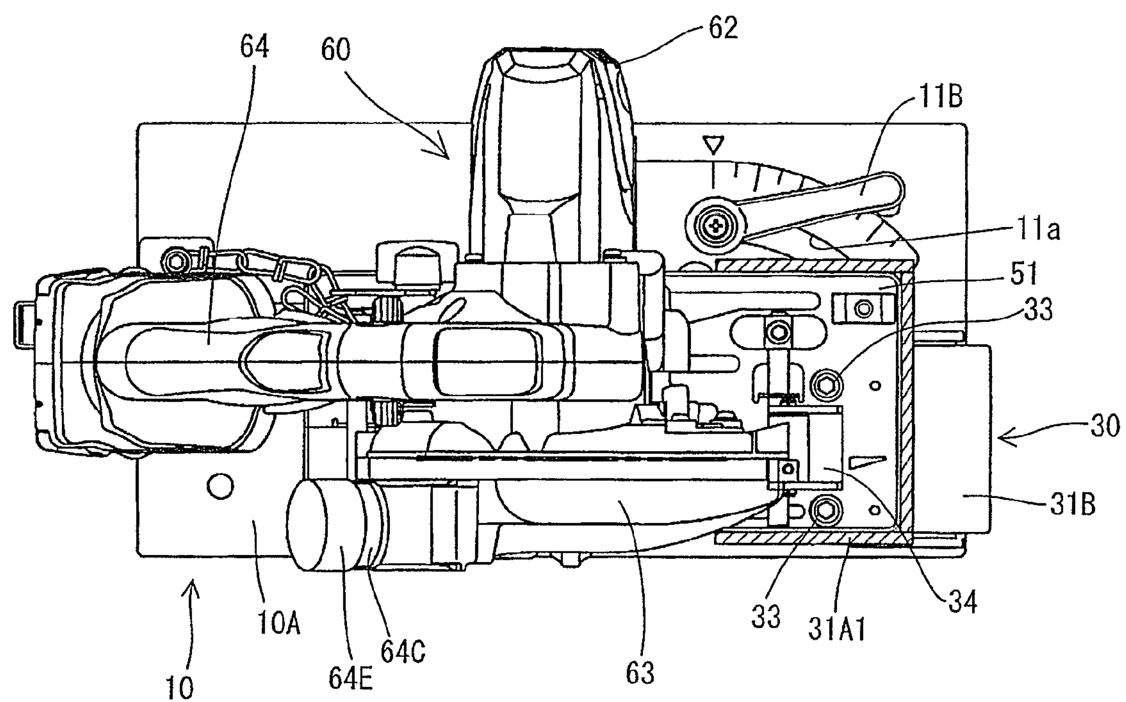
FIG. 14 is a partial cross-sectional view showing another modification of the cutting apparatus according to the first embodiment.

When the circular saw device 50 is mounted on the fixed surface plate 10, only the male threads 33 are used. However, as shown in FIG. 14, a guide 31A1 may be provided to the mounting portion 31A. The guide 31A1 is provided at a rear side surface and a part of right and left side surfaces of the base plate 51. The guide 31A1 can facilitate positioning of the circular saw device 50 with respect to the fixed surface plate 10 when the circular saw device 50 is mounted on the fixed surface plate 10.

A cutting apparatus according to a second embodiment of the present invention will next be described while referring to FIGS. 15 through 18. A cutting apparatus 101 according to the second embodiment is similar to the cutting apparatus 1 according to the first embodiment except for a configuration of a fixed surface plate. For example, the cutting apparatus 101 has a fixed surface plate 100 having a similar configuration to a base section of a so-called miter saw, and the fixed surface plate 100 supports the circular saw device 50 so that the circular saw device 50 can be tilted with respect to the fixed surface plate 100. Only the configuration of the cutting apparatus 101 different from that of the cutting apparatus 1 in the first embodiment will be described.

Figure 18:
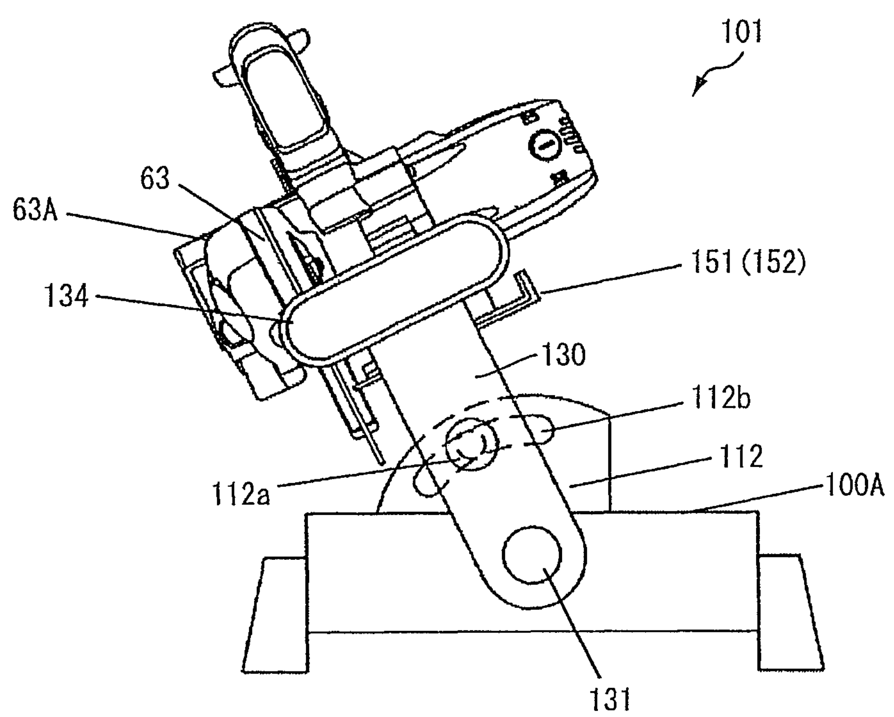
FIG. 18 is a rear view of the cutting apparatus according to the second embodiment showing a state when the cutting apparatus is tilted.

The fixed surface plate 100 is provided with an upper surface 100A and a tilt shaft 131 (shown in FIG. 18). The fixed surface plate 100 and a support portion 130 are connected through the tilt shaft 131. The tilt shaft 131 is configured such that an axial direction thereof is parallel to the upper surface 100A. In the axial direction of the tilt shaft 131, a side where the workpiece P is positioned relative to the tilt shaft 131 is defined as "front," and a side opposite to the "front" is defined as "rear." An upper direction of the upper surface 100A is defined as "upper," and a side opposite to the "upper" is defined as "lower." A direction perpendicular to a front-to-rear direction as well as perpendicular to an upper-to-lower direction is defined as a left-to-right direction. A direction from a reverse side of paper on which FIG. 1 is drawn to an obverse side of the paper is defined as "left", and a direction from the obverse side of the paper to the reverse side of the paper is defined as "right."

Figure 15:
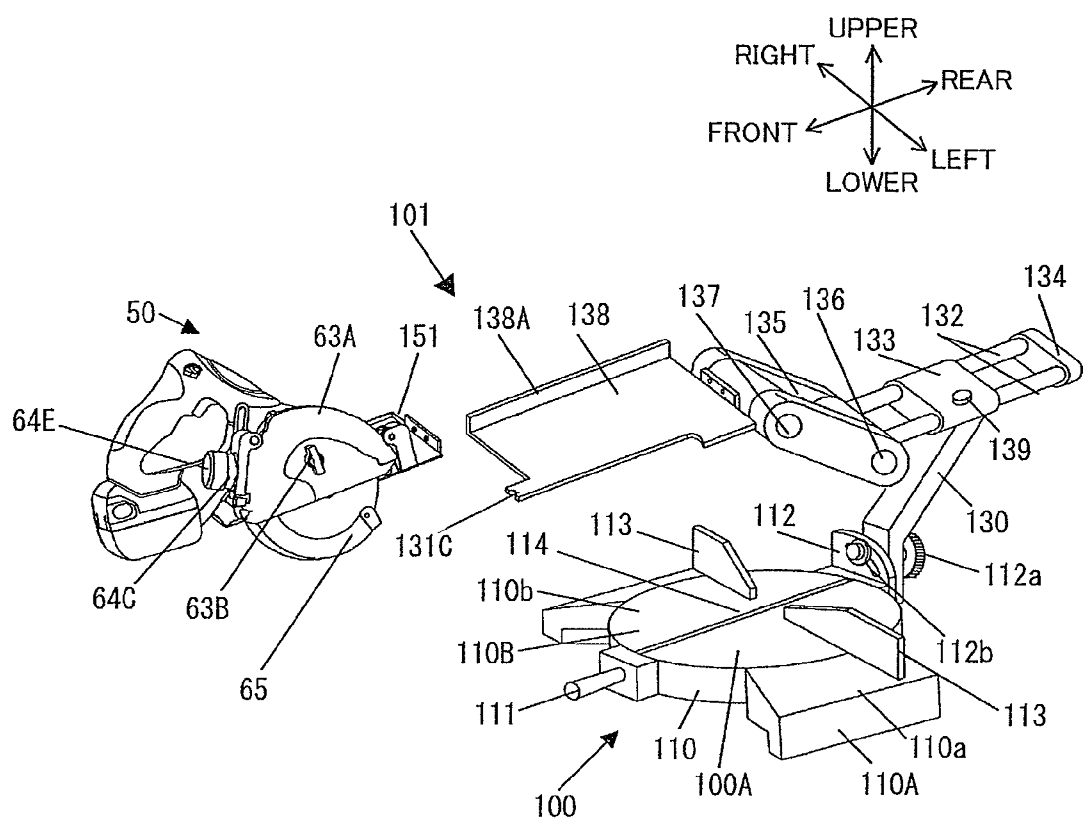
FIG. 15 is a perspective view of the cutting apparatus according to the second embodiment showing a state prior to assembly of a circular saw device into a base section.

As shown in FIG. 15, a base 110 constituting the fixed surface plate 100 includes a base plate 110A and a turntable 110B. The turntable 110B is embedded in the center of the base plate 110A. The turntable 110B is rotatably supported by the base plate 110A in a horizontal direction. In other words, the turntable 110B is rotatably supported about a rotational shaft that is oriented in a substantially vertical direction. The turntable 110B has an upper surface 110*b* in flush with an upper surface 110*a* of the base plate 110A. The upper surface 110*b* of the turntable 110B and the upper surface 110*a* of the base plate 110A constitute the upper surface 100A of the base 110.

The turntable 110B has one end (a rear end) provided with the support portion 130 and a tilt support portion 112, and another end (a front end) provided with a handle 111. The handle 111 serves as an operation section to rotate the turntable 110B about the rotational shaft (not shown) with respect to the base plate 110A. The tilt support portion 112 protrudes upward from the upper surface 110*b* of the turntable 110B. The tilt support portion 112 fixes a tilting position of the support portion 130 relative to the base 110. The tilt support portion 112 has a scale along a slot 112*b* so that a tilting angle of the support portion 130 relative to the base 110 can be obtained.

The upper surface 100A of the fixed surface plate 100 is provided with a pair of fences 113 spaced apart each other at a prescribed distance in the left-to-right direction. The pair of the fences 113 colinearly extends in the left-to-right direction. The pair of the fences 113 supports a side surface of the workpiece P. A groove 114 is formed in the center of the upper surface 110*b* of the turntable 110B and extends in the front-to-rear direction. The groove 114 is positioned between the pair of the fences 113. As described later, when the saw blade 61 is pivotally moved downward, the saw blade 61 is moved into the groove 114.

Each of the fences 113 has an upper slant surface, and the upper slant surface gradually reduces its height from the upper surface 100A toward the groove 114. As described later, the circular saw device 50 does not hit against the fences 113 when the circular saw device 50 is titled with respect to the base 110. Further, the fences 113 do not hinder sliding movement of guide bars 132 in the front-to-rear direction even when the circular saw device 50 is tilted with respect to the base 110. The upper slant surfaces of the fences 113 prevent the circular saw device 50 and a pivotally moving portion 135 from impinging against the fences 113.

The support portion 130 is tiltable about the tilt shaft 131 (FIG. 18) with respect to the base 110. The support portion 130 is tilted toward the base 110, and a knob 112*a* is inserted into the slot 112*b* of the tilt support portion 112 to fasten the support portion 130 and the tilt support portion 112. Hence, the support portion 130 can be fixed at a desired tilting angle.

The support portion 130 has a lower end that is supported to the turntable 110B of the base 110 by the tilt shaft 131 (FIG. 18). The support portion 130 extends upward from the upper surface 100A of the fixed surface plate 100. The support portion 130 has an upper end having a guide support portion 133. A pair of the guide bars 132 is slidably supported by the guide support portion 133. Each of the guide bars 132 extends in the front-to-rear direction. Each of the guide bars 132 has a rear end to which a stopper 134 is attached, so that the guide bars 132 are not removed from the guide support portion 133. A front end of each guide bar 132 supports the pivotally moving portion 135.

The pivotally moving portion 135 is pivotally movable about a pin 136 relative to the guide bars 132. The pivotally moving portion 135 has a front end to which a mounting portion 138 is attached. The mounting portion 138 is pivotally movable about a pin 137 relative to the pivotally moving portion 135. Further, the mounting portion 138 is provided with a cover support member 131C having a function the same as that of the cover support member 31C described in the first embodiment. The mounting portion 138 is formed with female threads (not shown).

The pin 136 and the pin 137 are provided with coil springs (not shown) the same as the coil spring 30A shown in FIG. 12, respectively. The pin 136 and the pin 137 are normally biased upward by the coil springs.

As described above, the support portion 130 is tiltable with respect to the upper surface 100A from a state that the support portion 130 is arranged in the upper-to-lower direction in a direction that the left side of the saw blade 61 approaches the supper surface 100A. Therefore, bevel cutting can be performed while the saw blade 61 is titled with respect to the upper surface 100A.

Figure 16:
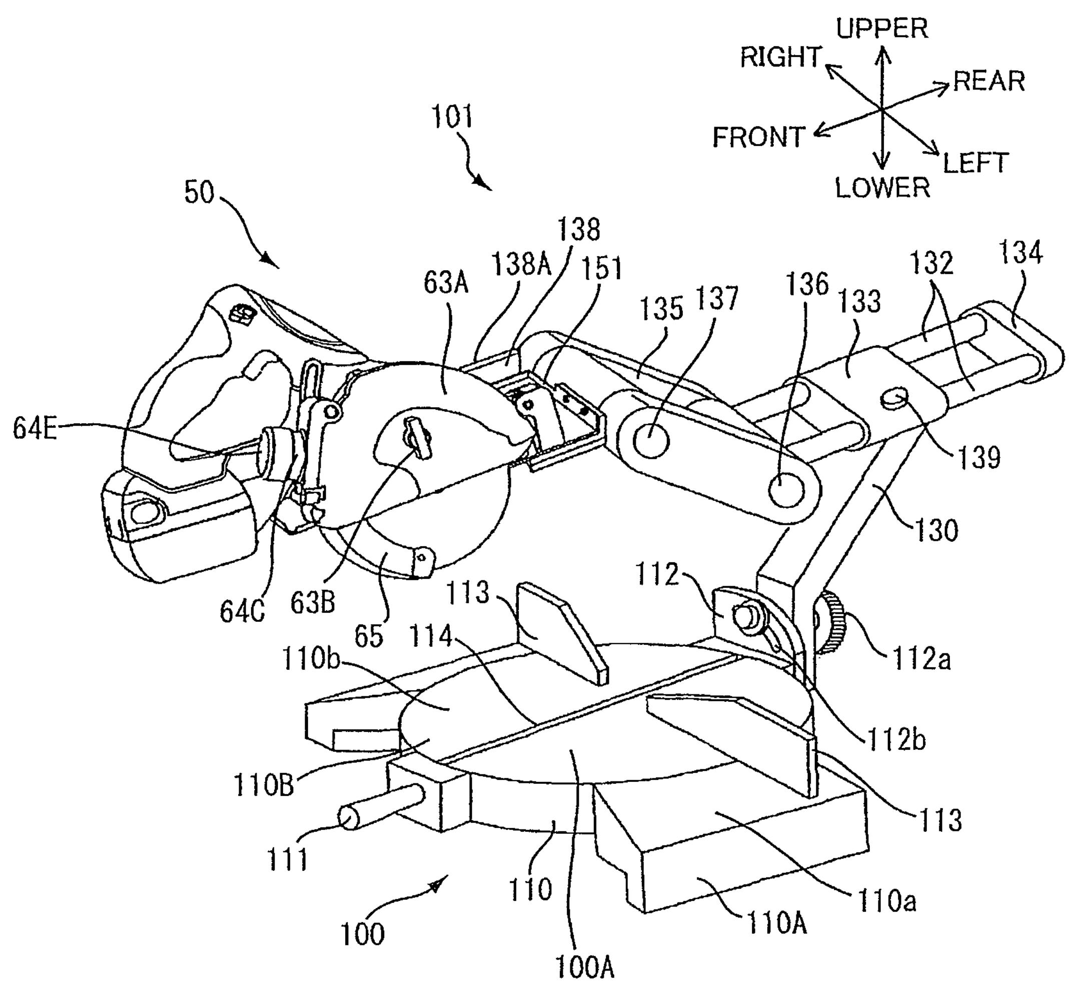
FIG. 16 is a perspective view of the cutting apparatus according to the second embodiment showing a state after assembly of the circular saw device into the base section.
Figure 17:
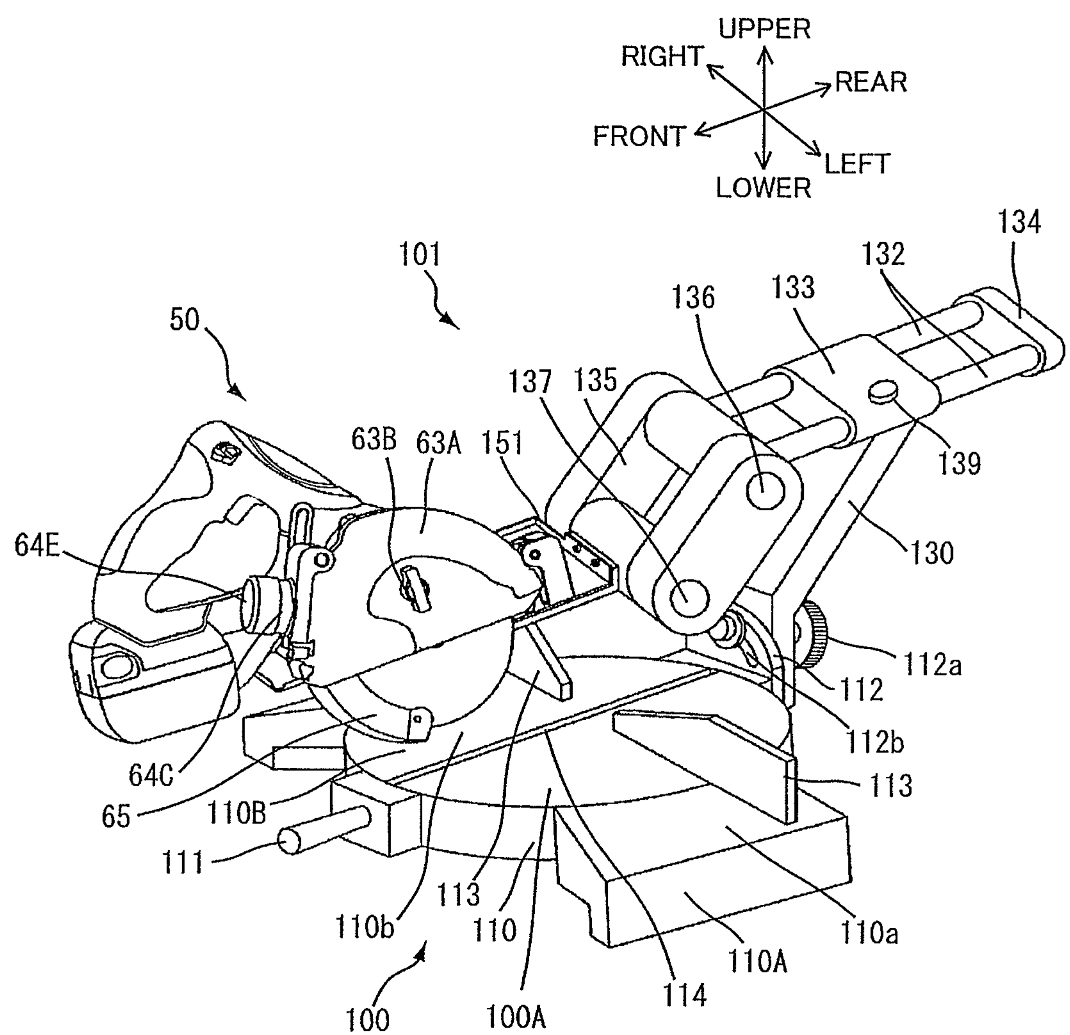
FIG. 17 is a perspective view of the cutting apparatus according to the second embodiment showing a state when the cutting apparatus is in use.

Further, the pivotally moving portion 135 is pivotally movably supported by the pin 136 in the upper-to-lower direction with respect to the guide bar 132. The mounting portion 138 is pivotally movably supported by the pin 137 in the upper-to-lower direction with respect to the pivotally moving portion 135. Accordingly, when the circular saw device 50 is mounted on the mounting portion 138 for use as stationary type as shown in FIG. 16, the circular saw device 50 can be positioned closer to the fixed surface plate 100 to cut the workpiece P by the saw blade 61 as shown in FIG. 17.

Further, the mounting portion 138 is connected to the guide bars 132 through the pivotally moving portion 135. By sliding the circular saw device 50 by the guide bars 132 in the front-to-rear direction, the circular saw device 50 is capable of cutting the workpiece P having a large dimension in the front-to-rear direction. A fixing screw 139 is provided in the guide support portion 133 in order to fix the guide bars 132 at a desired position or to release the fixed guide bars 132.

Further, in an initial state of the cutting apparatus 101, that is, prior to the cutting operation, the pivotally moving portion 135 is biased upward by a spring (not shown) so as to be directed diagonally upward, and the mounting portion 138 is connected to the front end of the pivotally moving portion 135, as shown in FIG. 15. Since the mounting portion 138 is disposed spaced apart from the fixed surface plate 100, the user can easily mount the circular saw device 50 on the mounting portion 138. Further, the workpiece P can be easily set on the fixed surface plate 100.

In order to facilitate mounting the circular saw device 50 on the mounting portion 138, the mounting portion 138 is provided with a slide rail 138A for guiding a right side edge of a base plate 151 (a main base plate 152) described later. When the circular saw device 50 is mounted on the mounting portion 138 in a state of the circular saw device 50 and the fixed surface plate 100 shown in FIG. 15, sliding movement of the base plate 151 along the slide rail 138A (or a pivotal direction of the safety cover 65) facilitates mounting the circular saw device 50 on the mounting portion 138 as shown in FIG. 16. In conjunction with sliding movement of the base plate 151, the safety cover 65 is automatically brought into abutment with the cover support member 131C so as to be pivotally moved. The user does not need to move the safety cover 65 manually, and accordingly, operability of the safety cover 65 can be improved. Fixing of the base plate 151 on the mounting portion 138 is the same as that of the base plate 51 on the mounting portion 31A described in the first embodiment.

Figure 8A:
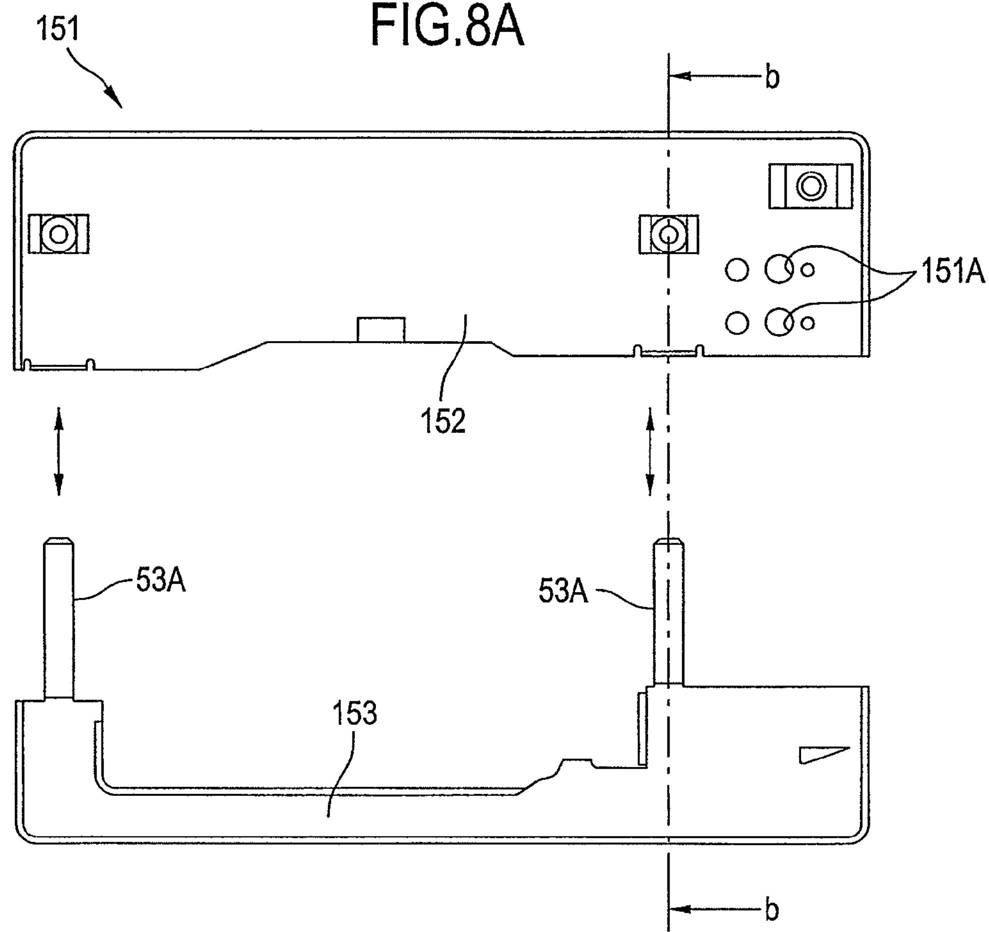
FIG. 8A is an exploded top plan view of a base plate provided in a cutting apparatus according to a second embodiment of the present invention.
Figure 8B:
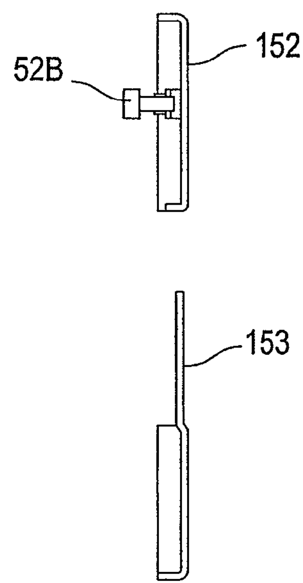
FIG. 8B is an exploded cross-sectional view of the base plate provided in the cutting apparatus according to the second embodiment.
Figure 8C:
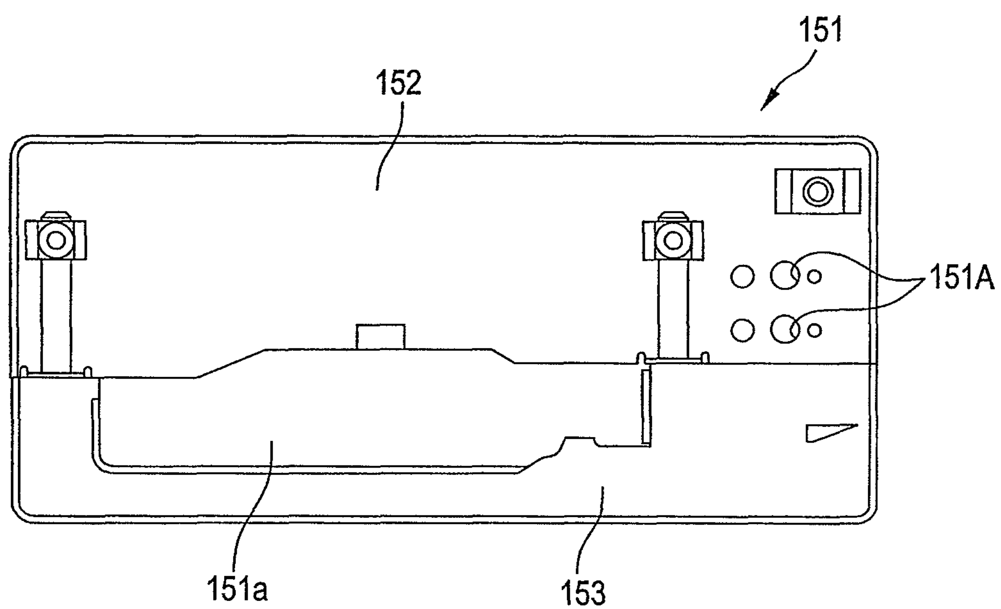
FIG. 8C is a top plan view of the base plate provided in the cutting apparatus according to the second embodiment.

Next, a structure of the base plate 151 will be described with reference to FIGS. 8A to 8C. As shown in FIG. 8C, the base plate 151 is formed in a substantially rectangular shape. The base plate 151 is separable in the substantially center of a short side along an imaginary line parallel to a long side of the base plate 151 into two portions, namely, the main base plate 152 and a sub base plate 153. In other wards, the base plate 151 is divided into the main base plate 152 and the sub base plate 153 along a imaginary plane parallel to one side surface 61A of the saw blade 61. An opening 151*a* is formed, in the same manner as the first embodiment, when the sub base plate 153 is attached to the main base plate 152. The entire main base plate 152 is positioned at the right side of the saw blade 61. The sub base plate 153 is positioned at the left side, a rear side, and a front side of the saw blade 61.

Further, the main base plate 152 is formed with a pair of female threads 151A at a right rear side of the opening 151*a*. The male threads 33 (shown in FIG. 5) are threadingly engaged with the female threads 151A and the female threads of the mounting portion 138, so that the main base plate 152 is fixed to the mounting portion 138.

According to the base plate 151 in the second embodiment, the entire main base plate 152 is positioned at the right side of the saw blade 61, and the sub base plate 153 is positioned at the left, rear and front sides of the saw blade 61. Therefore, no portion of the main base plate 152 protrudes to the left side of the saw blade 61. When the circular saw device 50 is mounted on the fixed surface plate 100 for use as stationary type and the bevel cutting is performed, removal of the sub base plate 153 from the base plate 151 can prevent the base plate 151 from impinging against the fixed surface plate 100. Further, the tilting angle of the circular saw device 50 can be enlarged. Accordingly, visibility of the saw blade 61 can be further improved. Although not shown in FIGS. 8A and 8C, the support portion 34 for connecting the saw blade section 60 to the base plate 151 is provided in the main base plate 152, in the same manner as the first embodiment.

While the invention has been described in detail with reference to the embodiments thereof, it would be apparent to those skilled in the art that various changes and modifications may be made therein without departing from the spirit of the invention.

Figure 21:
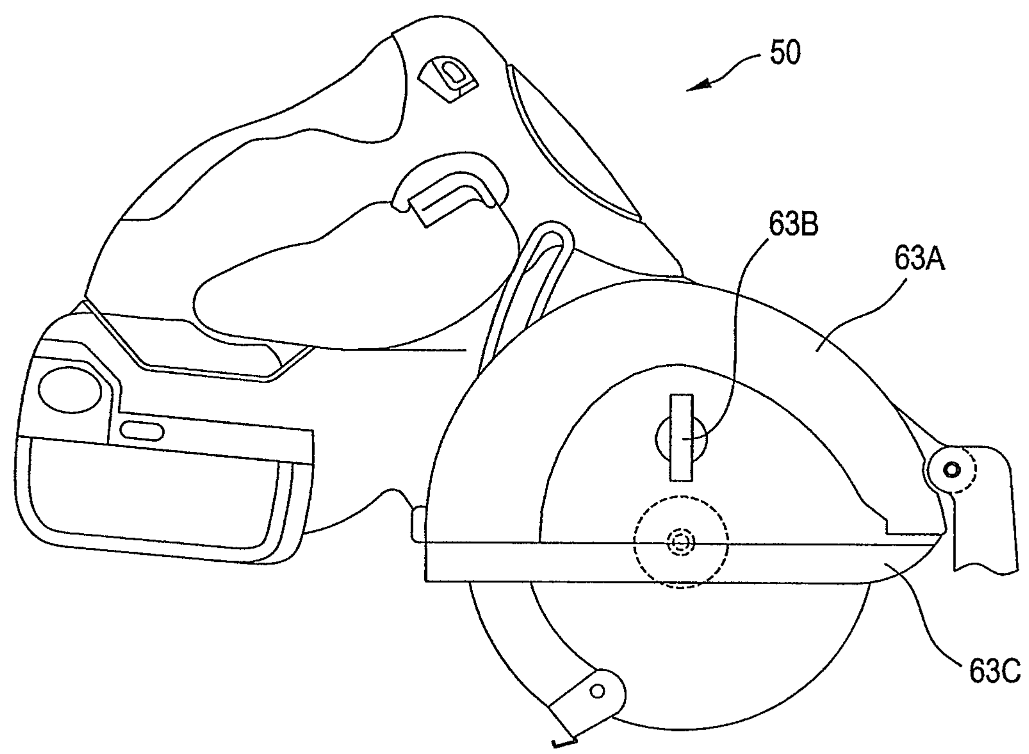
FIG. 21 is a side view showing one modification of the circular saw device constituting the cutting apparatus according to the second embodiment.
Figure 22:
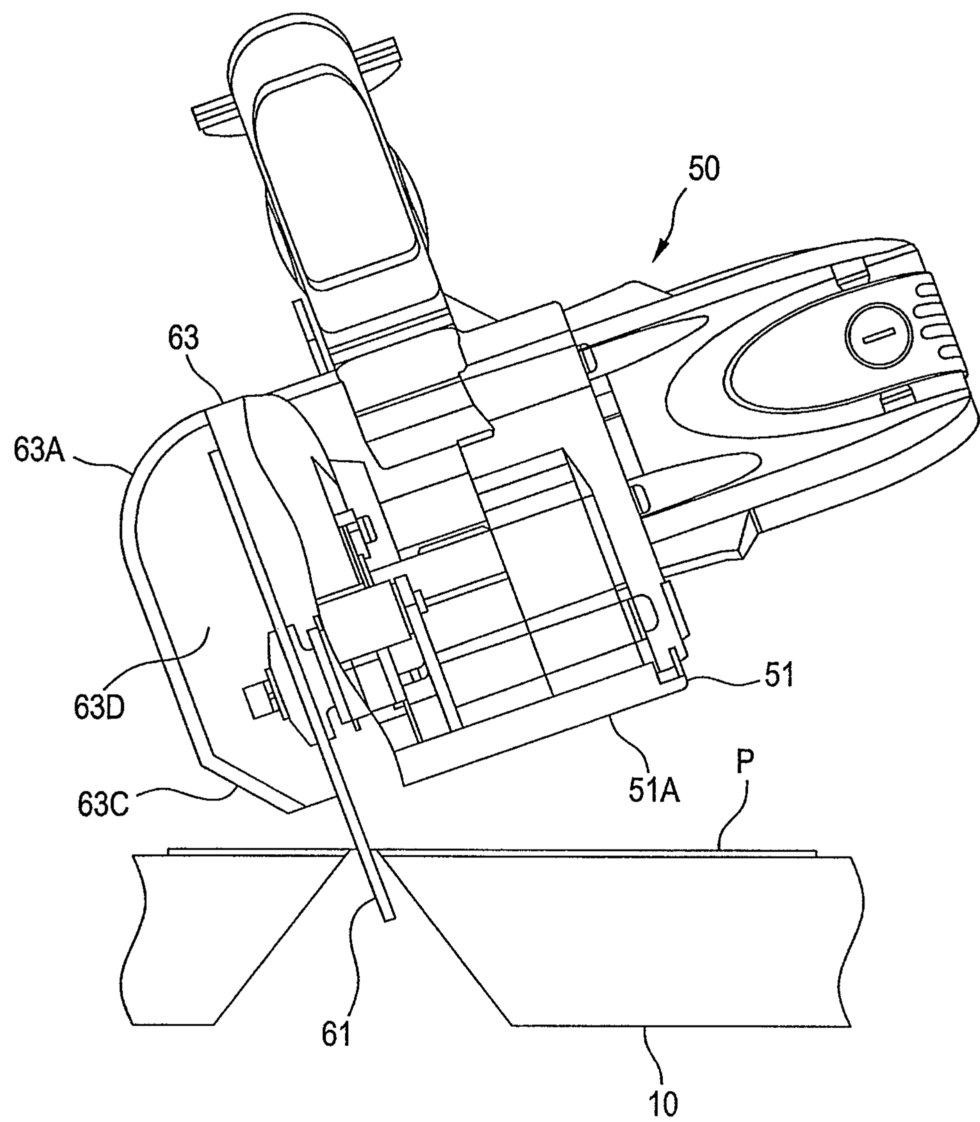
FIG. 22 is a partial cross-sectional view of the circular saw device constituting the cutting apparatus according to the second embodiment.

For example, in the first embodiment, the bottom surface 63C of the dust collection cover 63A is parallel to the bottom surface 51A. However, as shown in FIGS. 21 and 22, the bottom surface 63C opposite to the fixed surface plate 10 may be inclined so as to be closer to the saw blade 61 toward the fixed surface plate 10. In other wards, the bottom surface 63C is inclined such that the bottom surface 63C approaches the saw blade 61 as the bottom surface 63C approaches the fixed surface plate 10. With this arrangement, as shown in FIG. 22, when the circular saw device 50 is tilted toward the fixed surface plate 10, a distance from the dust collection cover 63A to the fixed surface plate 10 can be increased. Hence, the circular saw device 50 can be tilted toward the fixed surface plate 10 at a greater angle. The cutting chip can also be collected. Accordingly, visibility in the vicinity of the saw blade 61 can be improved.

Instead of the slide rail 138A provided on the mounting portion 138, a guiding portion extending in a direction parallel to the extending direction of the cover support member 31C may be provided on the mounting portion 31A. A guided portion guided by the guiding portion may be provided in the bottom surface 51A of the base plate 51. With this arrangement, by slidingly moving the circular saw device 50 relative to the mounting portion 31A so that the guided portion can be guided by the guiding portion, the extending end portion of the cover support member 31C is brought into contact with the supported portion 65C of the safety cover 65 and allows the safety cover 65 to be pivotally moved. Accordingly, the user can dispense with pivotally moving the safety cover 65 manually, and operability of the safety cover 65 can be improved.

Without the guided portion provided in the bottom surface 51A, the base plate 51 itself (a portion of the base plate 51 in a longitudinal direction) may be slidably movable along the guiding portion. Further, in addition to the guiding portion extending in the direction parallel to the extending direction of the cover support member 31C, a guide may be provided on the mounting portion 31A in a direction perpendicular to the extending direction as shown in FIG. 14. The guide can facilitate positioning the circular saw device 50 on the mounting portion 31A.

Figure 9:
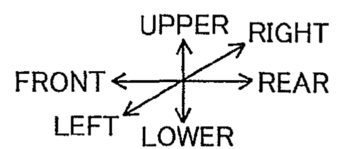
FIG. 9 is a side view showing one modification of the cutting apparatus according to the first embodiment.
Figure 9:
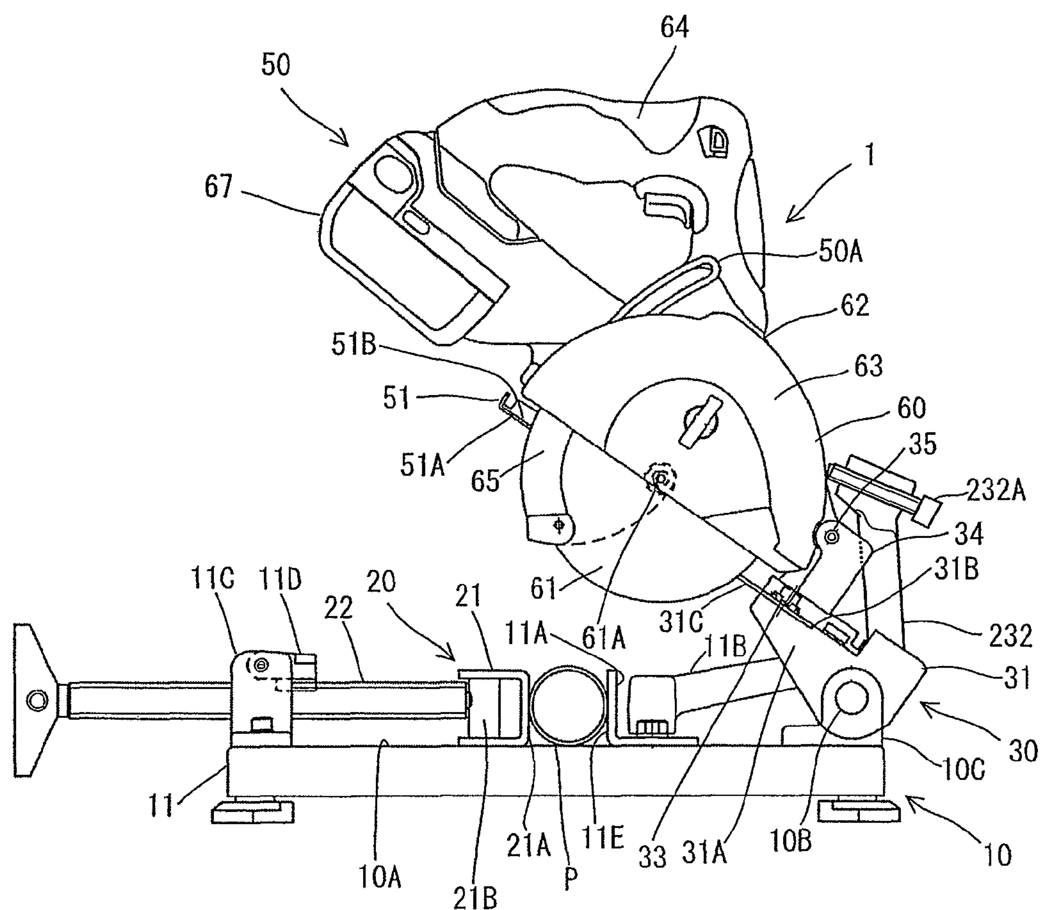

As shown in FIG. 9, a restriction portion 232 disposed at the rear side of the mounting portion 31A has a tip end portion, and the tip end portion may have an adjustable screw 232A. The adjustment screw 232A serves as a fine adjustment unit capable of fine adjusting a length of the restriction portion 232. The adjustment screw 232A is threadingly engaged with a screw hole formed in the tip end portion of the restriction portion 232. A tip end of the adjustment screw 232A is in contact with the rear portion of the saw cover 63. A protruding amount of the adjustment screw 232A can be adjusted by threadingly advancing or retracting movement of the adjustable screw 232A thereby bringing the adjustment screw 232A into contact with the rear portion of the saw cover 63. Even if a dimension error of the restriction portion 232 has been observed, or assembly of the cutting apparatus 1 is less accurate, the adjustment screw 232A reliably regulates pivotal movement of the saw blade section 60. Further, if the protruding amount of the saw blade 61 protruding from the base plate 51 may be preliminary set, the adjustment screw 232A allows the protruding amount of the saw blade 61 not to be less than the set protruding amount.

The dust collection cover 63A may be connectable to a dust collector. As shown in FIG. 15, a connecting port 64C for connecting the dust collector to the dust collection cover 63A is provided at a front portion of the dust collection cover 63A. A cap 64E is detachable from or attachable to the connecting port 64C. Removal of the cap 64E enables the dust collector to be connected to the connecting port 64C. This arrangement can prevent the cutting chip from being deposited in the dust collection cover 63A. Visibility of the saw blade 61 with the dust collection cover 63A and the cutting portion of the workpiece P can be further improved.

Figure 23:
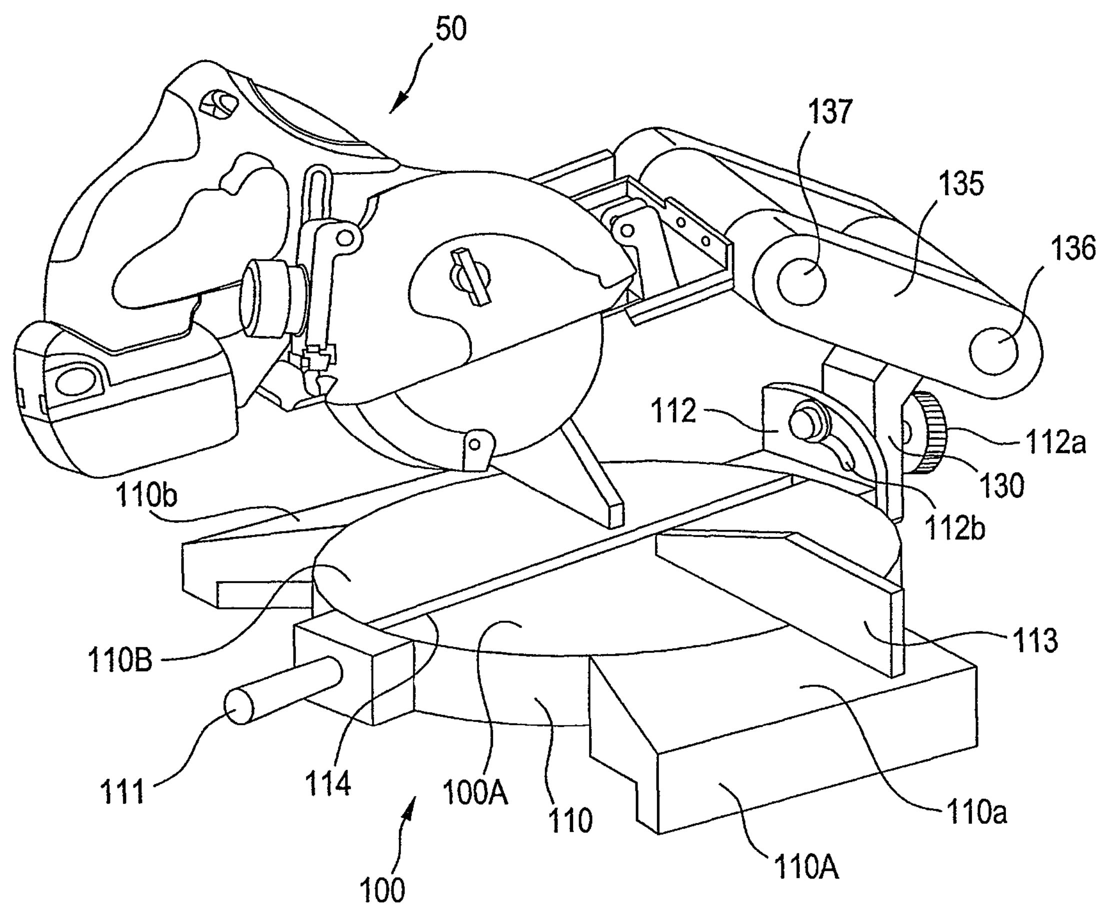
FIG. 23 is a perspective view showing one modification of the cutting apparatus according to the second embodiment.

In the second embodiment, the circular saw device 50 is slidably mounted on the fixed surface plate 100. However, as shown in FIG. 23, the guide bars 132 may be omitted, and the pivotally moving portion 135 may be pivotally movably supported directly to the support portion 130 with the pin 136.

Even if the circular saw device 50 is slidably supported to the fixed surface plate 100, the guide bars 132 may not be provided. Along a longitudinal direction of the pivotally moving portion 135, the pivotally moving portion 135 may be slidably provided with respect to the pin 136. Alternatively, the mounting portion 138 may be slidably provided with respect to the pin 137.

Further, instead of slidably moving the pivotally moving portion 135 (the mounting portion 138) integrally with the guide bars 132 with respect to the guide support portion 133, the guide bars 132 may be fixed to the guide support portion 133 so that the pivotally moving portion 135 is slidably movable on the guide bars 132. The pivotally movable portion 135 may be fixed in the same manner as that the guide bars 132 are fixed by the fixing screw 139. That is, regardless of the sliding function, if the circular saw device 50 mounted on the mounting portion 138 can be pivotally moved closer to and apart from the upper surface 100A and tilted toward the upper surface 100A, any arrangement may be adoptable.

Figure 24:
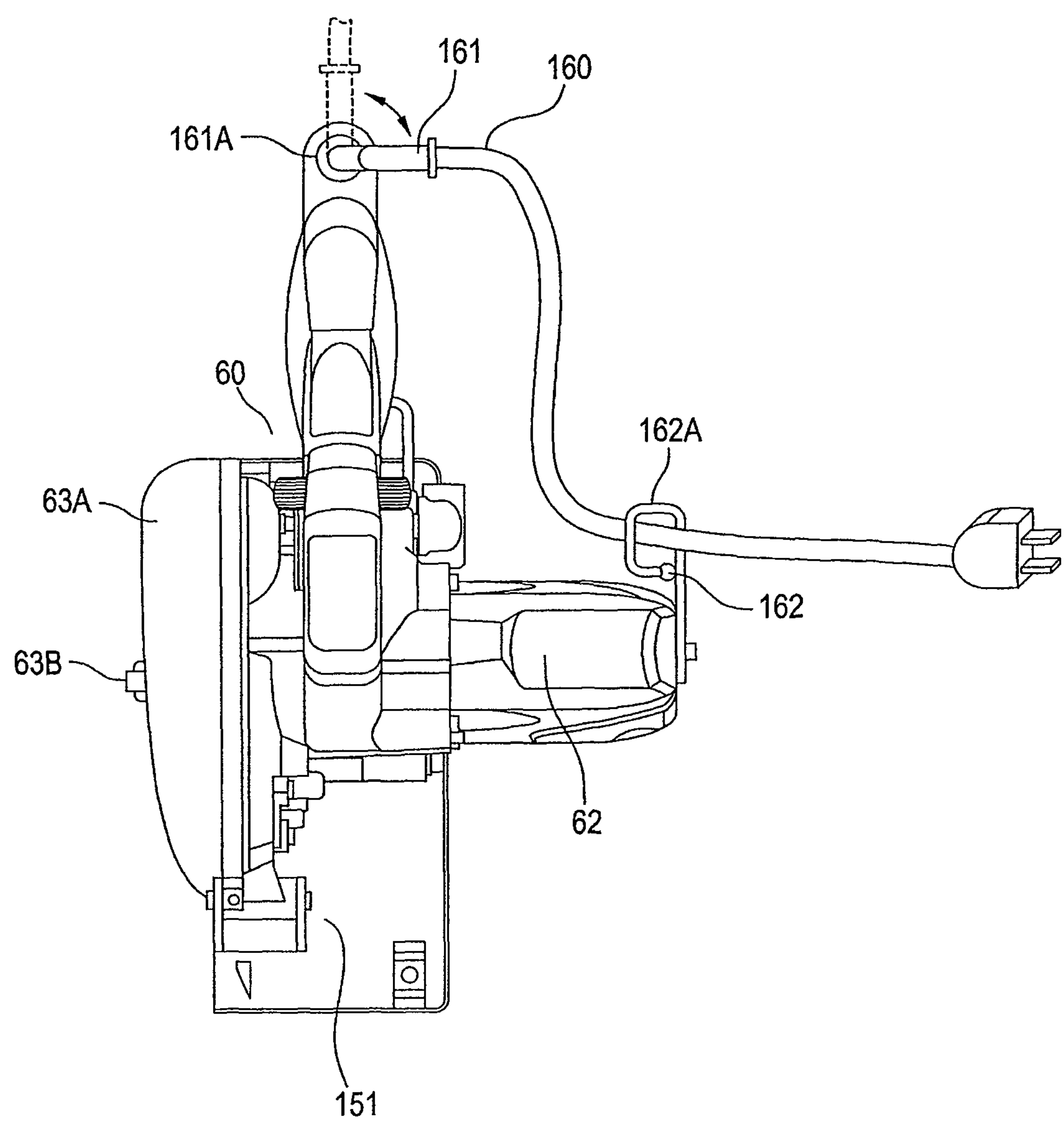
FIG. 24 is a top plan view showing one modification of the circular saw device constituting the cutting apparatus according to the embodiments.

Further, the above circular saw device 50 employs the battery pack 67 as a power source of the motor. However, instead of the battery pack 67, an AC power may be applicable. As shown in FIG. 24, the circular saw device 50 is provided with a power supply cord 160 that is connected to a front end of the handle 64. The power supply cord 160 has an attaching portion 161. The attaching portion 161 is connected to the handle 64 via a pivot portion 161A. The attaching portion 161 is pivotally movable about the pivot portion 161A in a direction indicated by an arrow in FIG. 24.

The housing 62 of the saw blade section 60 is provided with a hook portion 162 for hooking the base plate 151. The hook portion 162 is fixed to the housing 62 by screws, or integrally formed with the housing 62. The hook portion 162 is formed with a hoop 162A to easily hook the power supply cord 160. When the circular saw device 50 is used as stationary type, the power supply cord 160 is put on the hook portion 162. Hence, the power supply cord 160 does not disturb the user during the cutting operation. Nor is the power supply cord 160 erroneously cut by the saw blade 61.

Further, when the circular saw device 50 is used as portable type, the power supply cord 160 is removed from the hook portion 162 (the hoop 162A). Accordingly, the length of the power supply cord 160 can be efficiently utilized. The user can use the circular saw device 50 at a remote location from a power receptacle.

Making use of the AC power considerably prolongs the duration of the cutting operation. Further, without the battery pack 67, the weight of the circular saw device 50 can be lightened, and thereby reducing the burden imposed on the springs of the pins 136 and 137. Accordingly, service lives of the springs can be prolonged.

Unless the power supply cord 160 disturbs the user during the cutting operation, it is not necessary to provide the hook portion 162 in the housing 62. The hook portion 162 may be disposed on the base plate 151.

Further, the power supply cord 160 may be provided in the circular saw device 50, and the power receptacle may be formed in the fixed surface plate 100. The power supply cord 160 of the circular saw device 50 may be connected to the power receptacle. Further, the fixed surface plate 100, more specifically, the pivotally moving portion 135 is provided with the hook portion 162 for the power supply cord 160.

The cutting apparatus in the present invention is particularly useful in the field of cutting apparatuses in which a circular saw device is detachable from or attachable to the base section.

What is claimed is:

1. A cutting apparatus comprising:

a cutting device comprising:

a motor;

a circular saw blade driven by the motor to cut a workpiece, wherein the circular saw blade has a first side surface and a second side surface opposite to the first side surface;

a housing rotatably supporting the circular saw blade and accommodating the motor; and a base plate connected with the housing and formed with an opening into which the circular saw blade is inserted, the base plate including a main base plate connected with the housing and a sub base plate detachably mounted on the main base plate, the main base plate and the sub base plate forming a bottom surface when the sub base plate is mounted on the main base plate, wherein the motor is positioned at the first surface side of the circular saw blade and the sub base plate is positioned at the second side surface side of the circular saw blade, and wherein the opening is formed by the main base plate and the sub base plate; and a base section for supporting the workpiece, the cutting device being detachably mounted on the base section and being pivotably supported by the base section to be moved toward and away from the base section to cut the workpiece, wherein the cutting device is mounted on the base section by attaching the main base plate to the base section.

2. The cutting apparatus according to claim 1, wherein the base section comprises:

a base surface on which the workpiece is supportable; and a support portion including a mounting portion that detachably mounts the cutting device, and a pivoting support portion that pivotably supports the cutting device, the support portion being tiltably movable relative to the base surface.

3. The cutting apparatus according to claim 2, wherein the support portion is configured to tilt such that the another side surface of the circular saw blade moves toward and away from the base surface.

4. The cutting apparatus according to claim 2, wherein the cutting device detachably mounts a battery pack, the battery pack being provided at a position spaced farther apart from a pivot axis of the cutting device than the circular saw blade.

5. The cutting apparatus according to claim 2, wherein the base plate is divided into the main base plate and the sub base plate along an imaginary plane parallel to one side surface of the circular saw blade.

6. The cutting apparatus according to claim 1, wherein the cutting device includes a cover for collection cutting chips that is detachably attached to the housing, the cover covering a part of the second side surface of the circular saw blade.

7. The cutting apparatus according to claim 6, wherein the cover has an outer surface opposing the base section, the outer surface being inclined such that the outer surface approaches the second side surface of the circular saw blade as the outer surface approaches the base section.

8. A cutting apparatus comprising:

a cutting device comprising:

a motor;

a circular saw blade driven by the motor to cut a workpiece;

a housing rotatably supporting the circular saw blade and accommodating the motor; and a base plate connected with the housing and formed with an opening into which the circular saw blade is inserted, the base plate including a main base plate connected with the housing and a sub base plate detachably mounted on the main base plate; and a base section for supporting the workpiece, the cutting device being detachably mounted on the base section and being pivotably supported by the base section to be moved toward and away from the base section to cut the workpiece, wherein the circular saw blade has an outer circumferential portion, wherein the base plate has a bottom surface, the bottom surface being formed with the opening through which the circular saw blade projects downward beyond the bottom surface, the circular saw blade having a first portion housed in the housing and a second portion protruding from the bottom surface, wherein the cutting device further comprises a protection member pivotably provided on the housing and configured to project downward beyond the bottom surface to cover a part of the outer circumferential portion of the second portion, and wherein the base section comprises an abutment member that abuts the protection member to pivot the protection member such that the protection member covers the outer circumferential portion of the second portion by a predetermined amount, the protection member being brought into abutment with the base section and pivotally moved to expose the covered outer circumferential portion of the second portion when the cutting device pivotally moves toward the base section.

9. The cutting apparatus according to claim 8, wherein the protection member exposes a portion of the circular saw blade spaced farthest apart from the bottom surface when the protection member covers the outer circumferential portion of the second portion by the predetermined amount.

10. The cutting apparatus according to claim 9, wherein the cutting device further comprises a biasing member that urges the protection member such that the protection member is pivotally moved in a direction that a covering amount increases, the covering amount representing an amount that the protection member covers the outer circumferential portion of the second portion.

11. The cutting apparatus according to claim 10, wherein the protection member covers at least the part of the outer circumferential portion of the second portion when the protection member covers the outer circumferential portion of the second portion by the predetermined amount.

12. The cutting apparatus according to claim 9, wherein, when the cutting device pivotally moves toward the base section to cut the workpiece by the circular saw blade, the protection member abuts the workpiece and is pivotally moved such that a covering amount decreases from the predetermined amount, the covering amount representing an amount that the protection member covers the outer circumferential portion of the second portion.

13. The cutting apparatus according to claim 8, wherein the base section further comprises:

a base surface on which the workpiece supportable;

a first member provided on the base surface and having a first abutment surface on which one part of the workpiece abuts; and a second member provided on the base surface and having a second abutment surface on which another part of the workpiece abuts, the second member being movable toward and away from the first member, the workpiece being pinched between the first member and the second member to be fixed to the base section, wherein, when the cutting device is pivotally moved at lower limit position thereof, the circular saw blade is configured to intersect with the base surface in a region between a surface extending from the first abutment surface and a surface extending from the second abutment surface, and wherein the protection member having one end portion in a circumferential direction of the circular saw blade, the one end portion being positioned at a position between a position that the one end portion is opposite to a portion of the circular saw blade spaced farthest apart from the bottom surface and a position that the one end portion intersects with the surface extending from the second abutment surface when the protection member covers the outer circumferential portion of the second portion by the predetermined amount.

14. The cutting apparatus according to claim 8, wherein the circular saw blade has one side surface and another side surface, wherein the motor is positioned at one side surface side of the circular saw blade, wherein the protection member has a U-shaped in cross-section along a imaginary plane perpendicular to one side surface of the circular saw blade so as to cover the circular saw blade from one side surface to another side surface, and wherein the abutment member abuts a portion of the protection member positioned at one side surface side of the circular saw blade.

15. The cutting apparatus according to claim 8, wherein the base section comprises:

a base surface on which the workpiece is supportable; and a support portion including a mounting portion that detachably mounts the cutting device, and a pivoting support portion that pivotably supports the cutting device, the abutment member being provided on the mounting portion.

16. The cutting apparatus according to claim 15, wherein the cutting device is configured to be mounted on the mounting portion along a pivotal direction of the protection member.

* * * * *